Dec. 5, 1950

R. F. WILD 2,532,872

FREQUENCY RESPONSIVE MEASURING AND CONTROLLING APPARATUS

Filed May 26, 1944

*INVENTOR.*
RUDOLF F. WILD

BY
C B Spangenberg
ATTORNEY.

Dec. 5, 1950     R. F. WILD     2,532,872
FREQUENCY RESPONSIVE MEASURING
AND CONTROLLING APPARATUS
Filed May 26, 1944     5 Sheets-Sheet 2
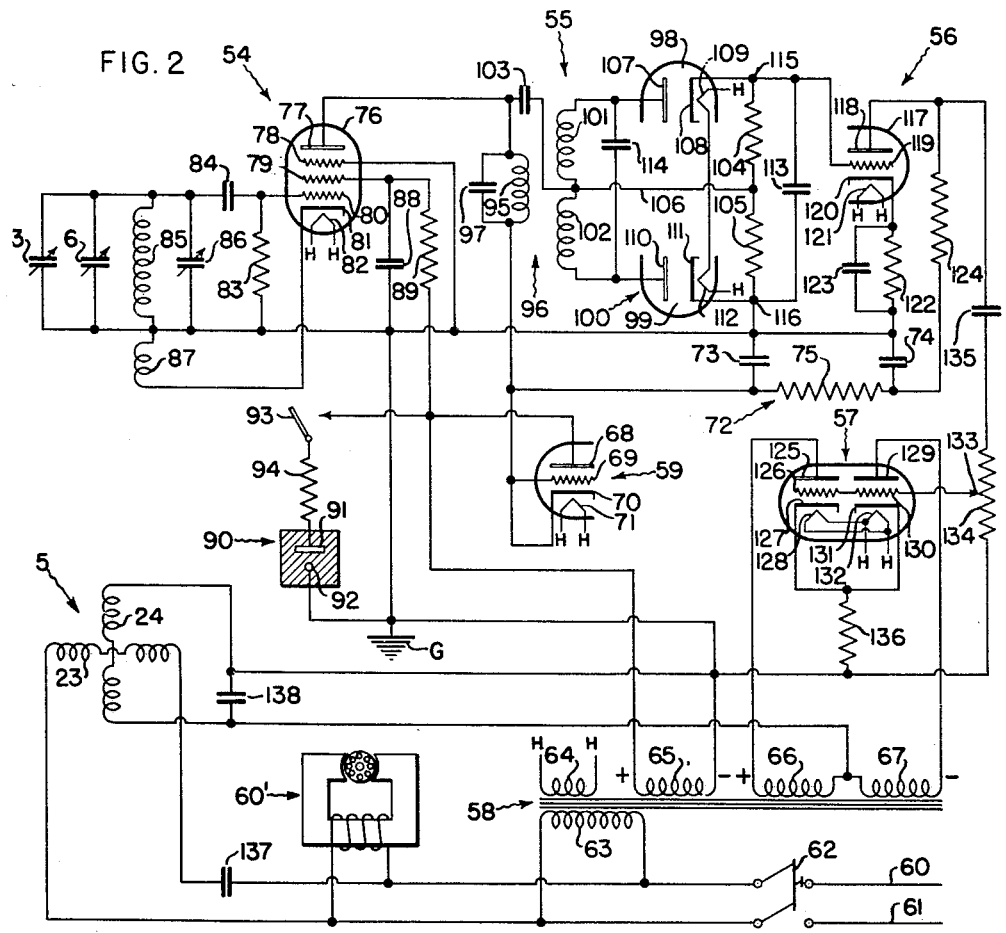
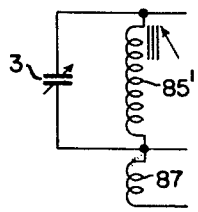
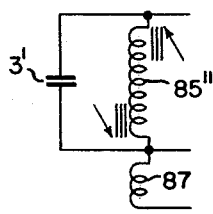
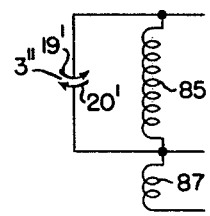
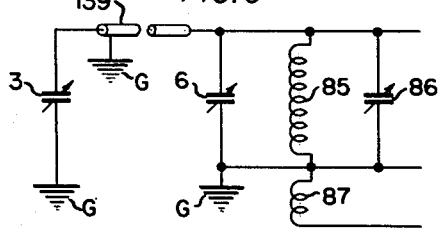
*INVENTOR.*
RUDOLF F. WILD
BY *C. B. Spangenberg*
ATTORNEY Dec. 5, 1950   R. F. WILD   2,532,872
FREQUENCY RESPONSIVE MEASURING
AND CONTROLLING APPARATUS
Filed May 26, 1944   5 Sheets-Sheet 3

*INVENTOR.*
RUDOLF F. WILD
BY
*C. B. Spangenberg*
ATTORNEY

*INVENTOR.*
RUDOLF F. WILD
BY
*E. B. Spangenberg*
ATTORNEY.

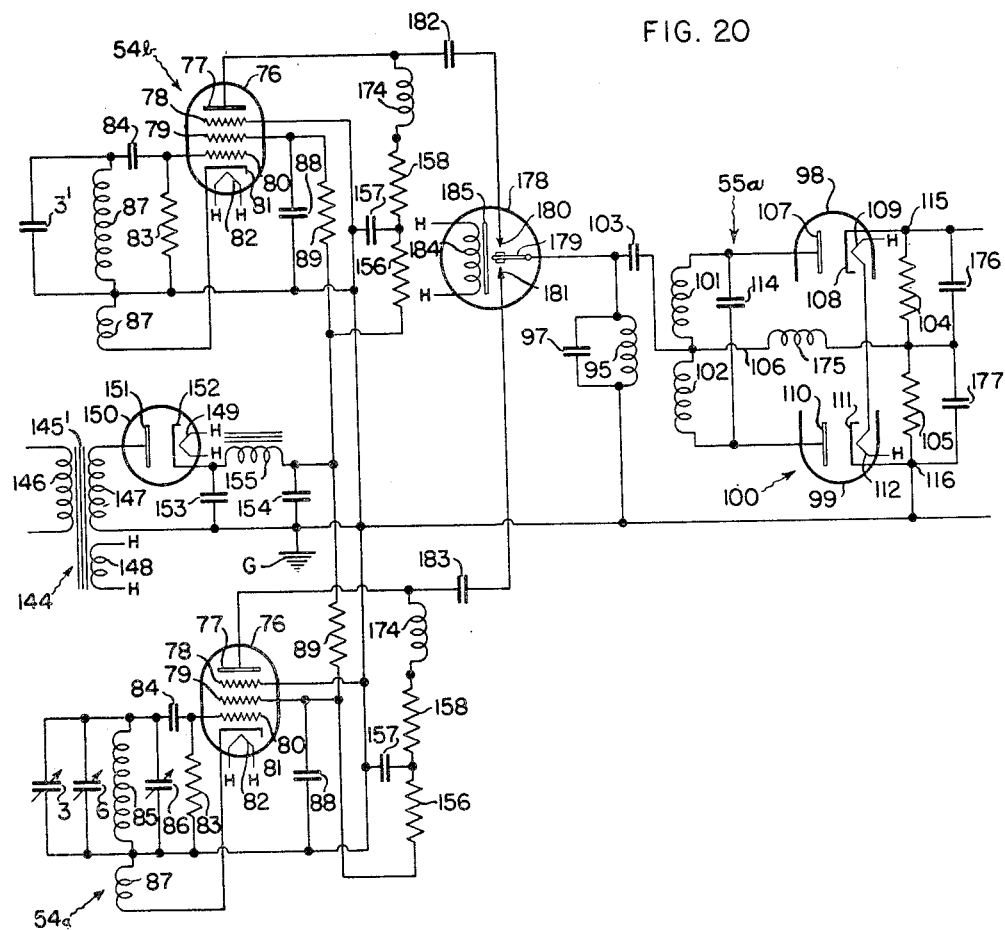

Patented Dec. 5, 1950

2,532,872

UNITED STATES PATENT OFFICE 2,532,872

FREQUENCY RESPONSIVE MEASURING AND CONTROLLING APPARATUS

Rudolf F. Wild, Philadelphia County, Pa., assignor, by mesne assignments, to Minneapolis-Honeywell Regulator Company, Minneapolis, Minn., a corporation of Delaware Application May 26, 1944, Serial No. 537,505

25 Claims. (Cl. 318—28)

The present invention relates to electrical apparatus generally and more particularly to electrical apparatus for measuring, indicating, recording and/or controlling variable conditions such as temperature, pressure, liquid level, flow and the like and also for telemetering, torque amplifying, boat steering, remote control, repeater positioning and the like.

A general object of the invention is to provide improved electrical apparatus of the above mentioned character.

A more specific object of the invention is to provide an improved tunable means comprising in combination a resonant circuit for generating an electric current which oscillates at a relatively high frequency, means for amplitude modulating said high frequency current at the frequency of oscillation of a relatively low frequency current, and high frequency discriminating means responsive to the amplitude and frequency of the modulated high frequency current for producing a voltage oscillating at the said low frequency and having an amplitude dependent upon the extent of deviation of the frequency of said high frequency current from a predetermined value.

By proper selection of the component parts of the tunable means and proper adjustment or tuning thereof, the amplitude of the resulting low frequency oscillating voltage may be zero when the frequency of oscillation of the high frequency current corresponds to the frequency to which the discriminating means is tuned, and the said resulting voltage may be of one phase or of opposite phase when the frequency of the high frequency current is greater than or less than the frequency value to which the discriminating means is tuned. The provision of such an arrangement also forms an object of this invention.

Because of the characteristic of the amplitude of the resulting low frequency oscillating voltage being zero and varying in amplitude in accordance with the extent of deviation of the frequency of oscillation of the high frequency current with respect to the tuning of the high frequency discriminating means and being of one phase or of opposite phase depending upon the direction of deviation, the tunable means is particularly adaptable to the control of phase responsive control means of the type disclosed in the application bearing Serial No. 421,173 and filed on December 1, 1941, by Walter P. Wills, which application issued as Patent No. 2,423,540 on July 8, 1947. The combination of such tunable means with a phase responsive control means also forms an object of the present invention.

A further object of the invention is to provide improved means for detuning or retuning the tunable means. The tunable means may be detuned by varying the frequency of oscillation of the high frequency current either by adjustment of the tuning of the resonant circuit utilized to create the high frequency current or by varying the frequency to which the high frequency discriminating means is tuned. The tunable means may be retuned by adjustment of the tuning of the said resonant circuit or by varying the frequency to which the high frequency discriminating means is tuned.

When the tunable means is utilized in combination with a phase responsive control means, the latter may be utilized for automatically retuning the tunable means. It is noted that if the tunable means is detuned in accordance with a variable condition such as temperature, pressure, flow and the like, the operation of the phase responsive means is controlled in accordance with such variable condition, and accordingly, provides a means for measuring, indicating, recording and/or controlling the variable condition. If the tunable means is detuned in accordance with the variations in position of an object, then the phase responsive means is operative to follow such position variations in retuning the tunable means and may be employed for purposes such as telemetering, torque amplifying, repeater positioning and the like. Such arrangements also form objects of this invention.

In one embodiment of the invention detuning of the tunable means is accomplished by adjustment of the resonant circuit to vary the frequency of the high frequency current from a predetermined value corresponding to the frequency to which the high frequency discriminating means is tuned, and retuning is accomplished by adjustment of the resonant circuit to return the frequency of oscillation of the high frequency current to that predetermined value.

In another form of the invention the frequency of oscillation of the high frequency current is maintained substantially constant and detuning of the tunable means is accomplished by varying the frequency of oscillation to which the high frequency discriminating means is tuned from a predetermined value corresponding to the frequency of oscillation of the high frequency current. Retuning is accomplished by adjustment of the high frequency discriminating means as required to tune it to the frequency of oscillation of said high frequency current.

The above two forms of the invention are particularly useful in systems where the detuning means are not too remotely located from the retuning means.

In still another form of the invention detuning of the tunable means is accomplished by varying the frequency of oscillation of the high frequency current within a predetermined band by adjustment of the resonant circuit creating the high frequency current, and retuning is accomplished by varying the frequency of oscillation to which the high frequency discriminating means is tuned as required to make the frequency of oscillation to which the high frequency discriminating means is tuned correspond to the frequency of oscillation of the high frequency current. This embodiment of the invention is particularly useful in telemetering systems in which the detuning means and retuning means are remotely located with respect to each other and is particularly adaptable for wireless transmission systems.

The detuning and retuning of the tunable means may be accomplished by adjusting capacitances and/or inductances in circuits associated with and comprising part of the resonant circuit creating the high frequency current and/or the high frequency discriminating means. These capacitances and/or inductances may be so designed as to have similar or dissimilar characteristics to provide linear or non-linear positioning control. For example, in telemetering applications it is ordinarily desired to have the phase responsive device positioned in a linear manner with respect to the position of the position controlling member and in such applications the capacitances and/or inductances would be so designed as to have similar characteristics.

In other applications, however, such as in flow measuring systems, it is not ordinarily desired to have the phase responsive device positioned linearly with respect to the position controlling member for the reason that the rate of fluid flow is usually measured in terms of the differential pressure produced across an orifice in the flow line, and that differential pressure varies in accordance with the square of the rate of flow. It is a feature of the present invention that the tunable means may be detuned by a capacitance or inductance positioned in accordance with the variations in said differential pressure and may be retuned by adjustment of a capacitance or inductance having a non-linear characteristic by the phase responsive means. By designing one of the capacitances or inductances in such manner that its characteristic bears a square power relation with respect to the characteristic of the other capacitance or inductance, the operation of the phase responsive means may be so controlled as to cause the latter to be positioned directly in accordance with the rate of flow rather than the differential pressure. As the description proceeds it will be evident that other relationships in the characteristics of the detuning and retuning means may be provided as required to meet the needs of different applications. All of such relationships fall within the purview of this invention.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Fig. 2 illustrates the electrical circuit arrangement of Fig. 1;

Figs. 6, 7, 8 and 9 are wiring diagrams illustrating various additional ways of detuning and retuning the electrical circuit of Fig. 2;

Fig. 20 illustrates another embodiment of the invention.

Figure 1:
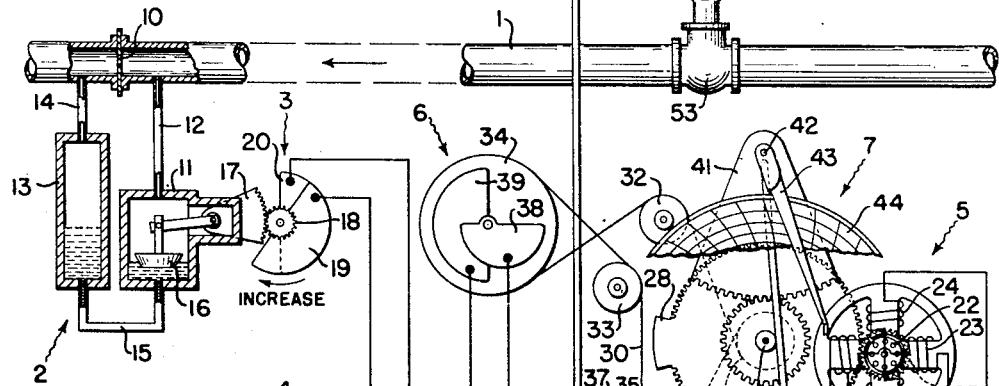
Fig. 1 is a diagrammatic illustration of one embodiment of the invention.

In Fig. 1 I have illustrated, more or less diagrammatically, a measuring, indicating, recording and controlling apparatus for measuring, indicating, recording and controlling the rate of flow of a fluid through a pipe or conduit 1. The rate of flow of fluid through the pipe 1 is detected by a manometer generally designated at 2 which is arranged to operate a variable condenser designated by the numeral 3 for detuning a resonant electrical circuit in which the variable condenser is connected. Specifically, the detuning means or variable condenser 3 is electrically connected to and arranged to control the operation of electronic apparatus designated generally by the reference character 4.

The electronic apparatus 4 includes an oscillator, frequency discriminating means, a voltage amplifier and a power amplifier. One desirable form which the electronic apparatus 4 may take is illustrated in detail in Fig. 2. The electronic apparatus 4 is arranged to control the selective energization for rotation in one direction or the other of a reversible electrical motor generally designated at 5. As shown, the motor 5 is of the rotating field type and is arranged to operate retuning means designated by the reference character 6 for accomplishing a follow-up or rebalancing action on the electronic apparatus 4. Motor 5 also operates indicating and recording mechanism generally designated at 7 and control apparatus shown generally at 8 which, in turn, operates control means designated by the character 9 for controlling the flow of fluid through the pipe 1.

The manometer 2 for ascertaining the rate of flow of fluid through the pipe 1 may be of any known type, and as shown, includes an orifice plate 10 which is positioned in the pipe 1 for the purpose of creating a pressure differential across the orifice plate 10 which varies in accordance with the rate of flow of fluid through the pipe.

The pressure differential so produced is a square function of the rate of flow through the pipe. Manometer 2 also includes a high pressure chamber 11 which is connected by a tube 12 to the high pressure side of the orifice plate 10 and includes a low pressure chamber 13 which is connected by a tube 14 to the low pressure side of the orifice plate 10. The low pressure chamber 13 and the high pressure chamber 11 communicate with each other through a tube 15.

The relative levels of mercury or other suitable liquid located in the pressure chambers 11 and 13 vary in acccordance with the difference in the pressures within those chambers, and consequently, provide a measure of the rate of fluid flow through the pipe 1. A member 16 which floats on the mercury in the high pressure chamber 11, and hence, rises and falls in accordance with the variations in pressure differential in the two chambers 11 and 13, is arranged to deflect angularly a gear sector 17. The gear sector 17 meshes with a gear 18 which is arranged to operate the detuning means or variable condenser 3. To this end the detuning means 3 comprises movable condenser plates 19 which are deflected relatively to stationary condenser plates 20 by the gear 18 upon angular deflection of the gear sector 17. As shown in Fig. 1 an increase in the rate of fluid flow through the pipe 1 causes the condenser plates 19 to rotate in a clockwise direction to decrease the capacitance between the condenser plates 19 and 20.

The reversible electrical motor 5 includes a stator 21 and a rotor 22 which is equipped with suitable conductor bars. The stator 21 is provided with a power winding 23 and with a control winding 24. Depending upon the phase relation of the electrical current flow through the power windings to that through the control windings, as is more fully explained hereinafter, the rotor 22 is actuated for rotation in one direction or the other to cause rotation of a pinion gear 25 in one direction or the other. The pinion gear 25 drives a gear 26 which is carried by a shaft 27 and is provided with a projection 28 which is arranged to abut against the pinion gear 25 for the purpose of limiting the extent of rotation of the gear 26.

The gear 26 carries a cable drum 29 which operates a cable 30 strung over pulleys 31, 32 and 33 and a cable drum 34. The pulley 31 is carried by a lever 35 which is biased by a spring 36 in a clockwise direction about the pivot point 37 to maintain the cable 30 taut. The cable drum 34 is arranged to operate the retuning means 6 which, as shown, comprises a variable condenser having movable condenser plates 38 adapted to be rotated with respect to relatively stationary condenser plates 39 upon rotation of cable drum 34. The retuning means 6, therefore, is adjusted in accordance with the angular positions assumed by the rotor 22 of the motor 5.

The shaft 27 which carries the gear 26 may operate an indicating pointer with respect to a suitably calibrated indicating scale, not shown. Also mounted on the shaft 27 is a gear 40 which meshes with a gear sector 41 so that upon operation of the motor 5 the gear sector 41 is rotated about its pivot 42. The gear sector 41 positions a pen arm 43 with respect to a slowly rotating chart 44 for the purpose of providing a continuous record of the rate of fluid flow through the pipe 1 on the chart 44.

The gear sector 41 also operates a link 45 which is arranged to adjust the position of the flapper of a pneumatic control device 46 forming part of the control apparatus 8. The pneumatic control device 46 may be of the type shown and described in Patent No. 2,125,081 which was issued to C. B. Moore on July 26, 1938, and includes a nozzle valve which is disposed in cooperative relation to the flapper and is connected by a bleed line 47 to a pilot valve 48 supplied with air under pressure by a pipe 49. The pressures developed by the pilot valve 48 are transmitted through a pipe 50 to the pneumatic control device 46 and by a pipe 51 to a pneumatic motor 52 which operates a valve 53 included in the control means 9 for controlling the rate of fluid flow through the pipe 1. The pneumatic control apparatus including the control device 46, the pilot valve 48, and the control means 9 may advantageously be utilized for the purpose of maintaining the rate of fluid flow through the pipe 1 at a substantially constant value.

The details of construction of the reversible motor 5, the indicating and recording apparatus 7, and the pneumatic control apparatus 8 are completely illustrated and described in the aforementioned W. P. Wills patent and, therefore, further description thereof is not considered necessary.

The wiring diagram of the electronic apparatus generally designated at 4, and controlled jointly by the variable condenser or detuning means 3 and by the variable condenser or retuning means 6 for selectively controlling the rotation and direction of rotation of the reversible motor 5, is more or less diagrammatically illustrated in Fig. 2. As shown in Fig. 2, the electronic apparatus 4 includes an electronic oscillator designated generally by the reference numeral 54, frequency discriminating means designated by the reference character 55, a voltage amplifier and limiter indicated at 56, and a power amplifier indicated at 57. Electrical energy is supplied to the apparatus by means of a transformer generally designated at 58, and D. C. energizing voltage, derived from the transformer 58 by means of a rectifier 59, is supplied to the oscillator 54 and the voltage amplifier 56. The apparatus also includes a motor generally designated at 60' for rotating the chart 44 at a constant slow speed.

In the embodiment of the invention shown in Figs. 1 and 2 the detuning means 3 and the retuning means 6 both control the frequency of oscillation of the high frequency current output of oscillator 54. The oscillator high frequency current output is arranged to be modulated at a regular and appreciably lower frequency under control of the transformer 58. Changes in the frequency of oscillation of the high frequency current flow in the output circuit of the oscillator 54 are detected by the frequency discriminating means 55 which is operative to create a low frequency fluctuating output voltage when the frequency of the oscillator output energy and the frequency to which the discriminating means 55 is tuned do not correspond. The fluctuating output voltage so created is of one phase or of the opposite phase depending upon whether the frequency of the oscillator output current is higher or lower than the frequency to which the frequency discriminating means 55 is tuned, and is amplified and limited by the voltage amplifier and limiter 56. The amplified quantity is applied to control the power amplifier 57, which, in turn, controls the rotation and direction of rotation of the reversible motor 5. Motor 5 operates to adjust the retuning means 6 for accomplishing a follow-up or rebalancing action on the apparatus and for operating the indicating, recording and controlling mechanism.

Power is supplied to the apparatus from alternating current supply lines 60 and 61 leading from a source of alternating current, not shown, which supplies alternating current of relatively low frequency. For purposes of illustration the source of alternating current may be assumed to be the ordinary 60 cycle per second alternating current supply although other frequencies of oscillation or alternation may be employed equally as well. A switch 62 controls the application of electrical energy to the apparatus from the supply lines 60 and 61. The transformer 58 includes a line voltage primary winding 63, the terminals of which are connected across the line wires 60 and 61, and also includes secondary windings 64, 65, 66 and 67. The secondary winding 64 is utilized to supply current to the heating filaments of the various electronic space discharge devices employed in the apparatus. The secondary winding 65 is employed to control the oscillator 54 and also to supply D. C. voltage to the oscilator 54 and the voltage amplifier and limiter 56 through the rectifier 59. The secondary windings 66 and 67 cooperate with the power amplifier 57 for supplying energizing current to the control windings 24 of the reversible motor 5. The positive and negative legends adjacent the secondary windings 65, 66 and 67 represent the polarity of the terminals of those windings during the first half of each cycle of the alternating current supply voltage.

The rectifier 59 and and voltage amplifier and limiter 56, while shown separately in Fig. 2, may desirably be contained in one envelope. To this end the rectifier 59 and the voltage amplifier and limiter 56 may each comprise one half of a commercially available type 7N7 tube. The rectifier 59 includes an anode 68, a grid 69, a cathode 70 and a heater filament 71. The heater filament 71 is connected to the secondary winding 64 and the grid 69 is connected to the cathode 70. A filter generally designated at 72 is provided in association with the rectifier 59 for producing a D. C. potential substantially free from ripple for energizing the output circuit of the voltage amplifier and limiter 56. As shown, the filter 72 includes a pair of condensers 73 and 74 and a resistance 75. The rectifier circuit may be traced from the positive side of the transformer secondary winding 65, as seen in Fig. 2, to the anode 68 of rectifier 59, the cathode thereof, and through the filter 72 back to the negative end of the transformer secondary winding 65, which end, as shown, is grounded at G.

The oscillator 54 is shown as an electron coupled oscillator and includes a pentode tube 76 which may be of the commercially available type 6SJ7. The tube 76 includes an anode 77, a suppressor grid 78, a screen grid 79, a control grid 80, a cathode 81 and a heater filament 82. The heater filament 82 is connected to and receives energy from the transformer secondary winding 64. Control grid 80 is connected through a resistance 83 to ground G and through a condenser 84 to one terminal of a parallel circuit including the detuning means or variable condenser 3, retuning means or variable condenser 6, and an inductance coil 85 which is inductively coupled to a coil 87, and a trimming condenser 86. Condenser 86 is provided for the purpose of providing a fine adjustment of the zero setting of the instrument pen and pointer. Preferably, the condenser 86 is provided with a suitable knob or kerf to facilitate adjustment thereof. Cathode 81 is connected through the inductance coil 87 to ground G. Screen grid 79 is connected through a condenser 88 to ground G and through a resistance 89 to the positive side of the transformer secondary winding 65.

The oscillating circuit of the oscillator 54 includes the control grid circuit of which the parallel circuit including the detuning means 3 forms a part, and also includes the screen grid circuit which may be traced from the positive side of the transformer secondary winding 65 through resistance 89, screen grid 79, cathode 81 and inductance coil 87 to the negative and grounded side of the secondary winding 65. These circuits are inductively coupled by the inductance coils 85 and 87 and provide for high frequency operation about a center frequency, which, for purpose of explanation, may be assumed to be 450,000 cycles per second.

Since alternating voltage is applied to the screen grid 79 from the transformer secondary winding 65, high frequency oscillation is produced by the oscillator 54 only during alternate half cycles of the supply line voltage, namely those half cycles during which the screen grid is positive. For convenience of explanation, these alternate half cycles will be referred to hereinafter as the operative half cycles.

The screen grid 79 and transformer secondary winding 65 are so utilized that the high frequency oscillation assumes its maximum amplitude near the beginning of each operative half cycle of the alternating supply voltage and continues at its maximum amplitude until near the end of that half cycle. The resistance 89 is included in the screen grid circuit to assist in the attainment of such operation and acts as a limiter to prevent the screen grid voltage from increasing beyond a predetermined value. In this manner the screen grid voltage is made to approximate a square wave during the operative half cycles of the 60 cycle per second alternating supply voltage. Accordingly, the high frequency oscillations produced by oscillator 54 are maintained at an approximately constant amplitude during the operative half cycles of the 60 cycle supply voltage, and are zero during the other half cycles of the alternating supply voltage.

It has been found that amplitude modulation of the high frequency oscillation obtained in the manner illustrated and described is adequate for many uses of the present invention, but when it is desired or necessary to obtain amplitude modulation more closely approaching a square wave envelope, a gaseous discharge tube as designated by the reference numeral 90 may be utilized. The gaseous discharge tube 90 is provided with an anode 91 and a cathode 92 and is connected between the terminals of the transformer secondary winding 65 by a circuit including a manually operable switch 93, a resistance 94, and the anode to cathode resistance of the gaseous discharge tube 90. When the manually operable switch 93 is closed, the tube 90 and resistance 94 operate conjointly with the resistance 89 to limit the screen grid voltage to a substantially fixed maximum.

The anode 77 of the oscillator pentode tube 76 is electron coupled to the screen grid 79 so that the high frequency oscillations occurring during the operative half cycles of the low frequency alternating supply voltage cause the voltage of the anode 77 to oscillate at the same high frequency during those operative half cycles. The high frequency oscillating circuit for the anode 77 may be traced from the cathode 70 of the rectifier 59 through the primary winding 95 of an intermediate frequency transformer 96 to the anode 77, screen grid 79, and condenser 88 to ground G. As shown, a condenser 97 is connected in parallel to the primary winding 95 for tuning the latter to the center frequency, 450,000 cycles per second, of the output current of oscillator 54. The suppressor grid 78 is connected directly to ground G and serves the usual purpose of decreasing secondary emission from the anode 77.

The frequency discriminating means 55 includes the intermediate frequency transformer 96 and a pair of diode rectifiers 98 and 99 which desirably may be contained within a single envelope generally designated at 100. The intermediate frequency transformer 96 includes a split secondary winding in addition to the primary winding 95. One half of the split secondary winding has been designated by the numeral 101 and the other half by the numeral 102. The center tap of the split secondary winding, comprising the point of engagement of the adjacent ends of the secondary winding sections 101 and 102, is connected through a blocking condenser 103 to the anode 77 of the pentode tube 76 and also to the upper terminal of the primary winding 95. The said center tap is also connected to the point of engagement of a pair of resistances 104 and 105 by means of a conductor 106. If desired, an inductance coil or choke may be inserted in the conductor 106. The usable output voltage from the frequency discriminator 55 is obtained across the resistances 104 and 105.

The diode rectifiers 98 and 99 may be contained within a single tube such as the commercially available type 6H6. As shown, the diode 98 includes an anode 107, a cathode 108 and a heater filament 109. The diode 99 similarly includes an anode 110, a cathode 111 and a heater filament 112. The heater filaments 109 and 112 are connected to and receive energizing current from the transformer secondary winding 64. The cathode 108 is connected through the resistance 104 and the conductor 106 to the center tap on the split secondary winding, and the cathode 111 is also so connected through the resistance 105 and the conductor 106. The anode 107 is connected to the end terminal of the split secondary winding section 101 and the anode 110 is connected to the end terminal of the secondary winding section 102. A condenser 113 is connected in parallel with both of the resistances 104 and 105. A condenser 114 is connected across the split secondary winding for tuning the latter to the center frequency, 450,000 cycles per second, about which the high frequency current output of oscillator 54 is adapted to be varied. The blocking condenser 103 and the condenser 113 are so selected as to present low impedance to the high frequency oscillating currents flowing through them. The condenser 97 and the transformer primary winding 95 are so selected as to provide high impedance in order to produce a large output signal from the discriminator. Preferably, the primary winding 95 is tuned to the same frequency as the split secondary winding.

When the frequency of the ocillating current applied to the transformer primary winding 95 is 450,000 cycles per second, the value to which both the primary winding 95 and the split secondary including sections 101 and 102 are resonant, the voltage induced in the winding sections 101 and 102 and appearing across the terminals of the split secondary will be 90° out of phase with the applied primary voltage. This voltage relationship is shown graphically in Fig. 3 wherein the vector $E_{95}$ represents the voltage applied to the primary winding 95 and the vectors $E_{101}$ and $E_{102}$ represent the voltages appearing across the split secondary winding sections 101 and 102, respectively. The phenomena giving rise to the 90° phase shift between the secondary and primary voltages is one known in the art and is based on the fact that in a transformer, the secondary winding of which is resonant, a phase shift of 90° occurs between the primary and secondary voltages.

Figure 3:
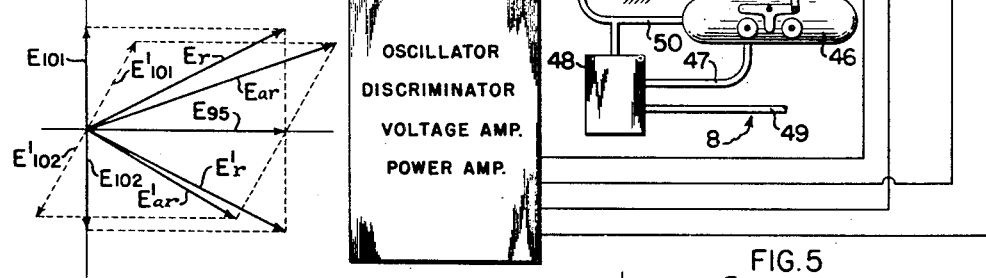
Figs. 3, 4 and 5 are graphs illustrating the operation of the frequency discriminator of Fig. 2.

The secondary winding sections 101 and 102 are so wound on the transformer 96 that the voltage appearing across the winding 101 is 180° out of phase with the voltage appearing across the winding 102, as may be seen by reference to Fig. 3. The voltage appearing across the secondary winding 101 is impressed on the circuit including the diode rectifier 98 and the resistance 104 while the voltage appearing across the secondary winding 102 is impressed on the circuit including the diode 99 and the resistance 105. Superimposed on these voltages impressed on the diodes 98 and 99, is the voltage developed across the primary winding 95. The primary voltage is superimposed on the diodes inasmuch as the upper terminal of the primary winding 95 is connected through the blocking condenser 103 to the point of engagement of the secondary winding sections 101 and 102. Thus, the primary voltage is impressed in series with the voltage appearing across the secondary winding 101 on the circuit including diode 98 and resistance 104, and the primary voltage is impressed in series with the voltage appearing across secondary winding 102 on the circuit including the diode 99 and resistance 105. The resultant voltage impressed on the circuit including the diode 98 is the vector sum of the primary voltage $E_{95}$ and the secondary voltage $E_{101}$, which vector sum is represented in Fig. 3 by the vector $E_r$. The vector $E'_r$ in Fig. 3 represents the resultant voltage impressed on the circuit including the diode 99. In each case the resultant voltage on each diode is the vector sum of two voltages which are in phase quadrature at resonance. The secondary voltage applied to the diode 98, however, leads the primary voltage by 90° while the secondary voltage applied to the diode 99 lags by 90° the primary voltage. The absolute values of the primary and secondary voltages in relation to each other are not critical and may be selected as desired.

The 90° phase relationship between the voltage applied to the primary winding 95 and the voltages appearing across the secondary winding sections 101 and 102 occurs only when the applied frequency to the primary winding 95 is the value to which both the primary winding 95 and the split secondary winding are resonant. Upon departure of the applied frequency from this value, the voltage appearing across the secondary winding sections 101 and 102 also departs from the 90° phase relationship with the primary winding applied voltage, as may be seen by reference to the vectors $E'_{101}$ and $E'_{102}$ in Fig. 3. For example, upon increase in the applied frequency from the value to which the secondary winding is resonant, the phase displacement between the voltage appearing across the secondary winding section 101 and the applied primary voltage decreases toward zero, while the phase displacement between the voltage appearing across the secondary winding section 102 and the primary voltage increases toward 180°. Upon decrease in the applied frequency the converse is true. That is to say, the phase displacement between the vectors $E_{101}$ and $E_{95}$ in Fig. 3 increases toward 180° while the displacement between the vectors $E_{102}$ and $E_{95}$ decreases toward zero. In other words, when the applied frequency deviates from the value to which the primary and secondary windings are resonant the voltage appearing across one of secondary winding sections 101 and 102 will be more nearly in phase with the primary voltage while the voltage across the other secondary winding section will be more out of phase with the primary voltage.

When the applied frequency to the primary winding 95 deviates slightly from the value to which the secondary winding is tuned, the resultant voltage applied to one of the diodes 98 or 99 will decrease, as may be seen by reference to the vector $E'_{ar}$ while the resultant voltage applied to the other diode will increase as is indicated by the vector $E_{ar}$. Upon greater deviation in the applied frequency in the same direction from the value to which the secondary winding is resonant, the resultant voltage applied to the first-mentioned diode will continue to decrease, while the voltage applied to the second-mentioned diode will increase to a maximum value and, upon still greater frequency deviation, also begin to decrease, as may be seen by reference to Fig. 4 wherein the curve $er$ represents the manner in which the resultant voltage applied to the diode 98 changes upon variation in the applied frequency and the curve $e'r$ represents the manner in which the resultant voltage applied to the diode 99 changes concomitantly.

Figure 4:
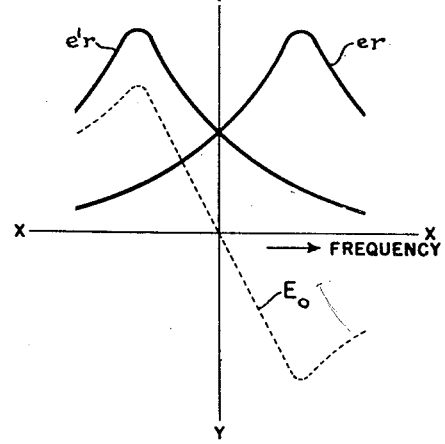

By reference to Fig. 4 it will be noted that the resultant voltage $er$ applied to the diode 98 will increase initially, as the applied frequency increases from the value to which the secondary winding is resonant, until it reaches a maximum value after which it will begin to decrease as the applied frequency is further changed in the same direction. Concurrently, the resultant voltage applied to the other diode 99 will decrease and continue gradually to decrease as the applied frequency deviates further from the resonant value. As a result of this action the voltage drop produced across the resistance 104 will be increased, while that across the resistance 105 will be decreased.

Upon deviation in the oscillator output current frequency in the opposite direction from the value to which the secondary windings are resonant, the resultant voltage applied to the diode 98 will decrease while the resultant voltage contemporaneously applied to the diode 99 will increase to a maximum value, following which it will also begin to decrease. As a result of this action the voltage drop produced across the resistance 105 will be increased while that across the resistance 104 will be decreased.

The manner in which the voltage drops across the resistances 104 and 105 change with variation in the applied frequency is illustrated in Fig. 4 by the curve $E_0$. At the point of intersection of the curve $E_0$ with the $x$—$x$ axis the voltage drops across the resistances 104 and 105 are equal. The portion of curve $E_0$ to the right of the $y$—$y$ axis represents the difference in voltage drops across the resistances 104 and 105, the voltage drop across resistance 104 being the greater, occurring upon an increase in applied frequency. The portion of curve $E_0$ to the left of $y$—$y$ axis represents the difference in magnitudes of the voltage drops across the resistances 104 and 105, the voltage drop across the resistance 105 being the greater, occurring upon a decrease in applied frequency.

Inasmuch as the high frequency current applied to the primary winding 95 of the discriminator is modulated at the frequency of the current supplied by the supply lines 60 and 61, the voltage drops which are produced across the resistances 104 and 105 will only be produced thereacross during the regularly recurring intervals when high frequency currents flow from the output circuit of the oscillator 54 to the frequency discriminator 55. When no high frequency currents are applied to the primary winding 95, no voltage difference is created across either of the resistances 104 and 105. Accordingly, there are two conditions in which the resultant of the voltages across resistances 104 and 105 and impressed across the terminals 115 and 116 is zero. The first condition is that in which no high frequency currents are applied to the primary winding 95 of the discriminator 55. The second condition is that occurring when the frequency of the high frequency currents applied to the discriminator 55 is the value to which the secondary winding of the discriminator is tuned. As was noted previously, high frequency currents are applied to the discriminator 55 only during alternate half cycles of the alternating current voltage derived from the supply lines 60 and 61. Consequently, when the frequency of the high frequency currents applied to the discriminator 55 is the value, 450,000 cycles per second, to which the secondary winding is tuned, no voltage drop is created between the terminals 115 and 116 of the resistances 104 and 105 during the operative half cycles of the alternating voltage supplied by the lines 60 and 61. During the other half cycles of the alternating supply voltage, no high frequency currents are applied to the discriminator 55 and in this case also no voltage drop appears between the terminals 115 and 116. Therefore, when the frequency of the high frequency current supplied to the discriminator corresponds to the value to which the discriminator is tuned, the potential of the terminal 115 is the same as that of the terminal 116.

Figure 5:
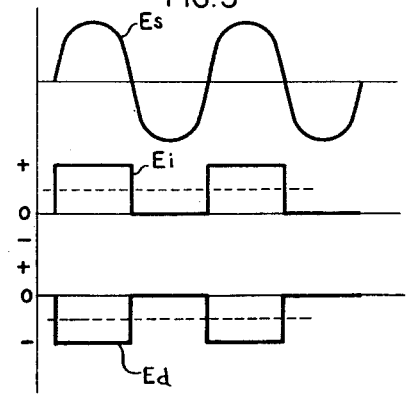

When the frequency of the high frequency currents applied to the discriminator 55 from the oscillator 54 increases above 450,000 cycles per second, the value to which the secondary winding of the discriminator is resonant, a resultant potential drop of the polarity rendering the terminal 115 positive with respect to the terminal 116 is created across the resistances 104 and 105 during the operative half cycles of the alternating voltage supplied by the mains 60 and 61. During the other half cycles no high frequency currents are applied to the discriminator 55 and therefore the potentials at the terminals 115 and 116 are identical. As a result a fluctuating or pulsating voltage is created between the terminals 115 and 116 upon increase in the frequency of oscillation of the high frequency currents applied to the discriminator 55. This fluctuating voltage will be of one phase or of opposite phase with respect to the voltage of the supply mains 60 and 61 and may for purposes of illustration be assumed to be in phase with the voltage of the supply mains as is shown in Fig. 5 wherein the curve $E_s$ represents the supply line voltage and the curve $E_1$ represents the output voltage of the discriminator.

Upon decrease in the frequency of oscillation of the high frequency currents applied to the discriminator 55 from the oscillator 54, a pulsating voltage of opposite phase is produced between the terminals 115 and 116. Specifically, during the operative half cycles of the voltage of the supply mains 60 and 61, the voltage drop across the resistance 105 will be greater than that across the resistance 104 to render the potential of the terminal 116 positive with respect to that of the terminal 115. During the other half cycles no high frequency currents are impressed on the discriminator 55, and therefore, the potentials at the terminals 115 and 116 are identical. Accordingly, a fluctuating voltage is produced between the terminals 115 and 116 which is 180° out of phase with the voltage of the supply lines 60 and 61. This voltage output from the discriminator is represented in Fig. 5 by the curve $E_d$.

From the foregoing it will be clear that the potentials at the terminals 115 and 116 are identical when the frequency of oscillation of the high frequency currents applied to the discriminator 55 is the value to which the secondary winding of the discriminator is resonant, and that upon deviation in the frequency of the applied high frequency currents to the discriminator in one direction or the other from the resonant value, a pulsating voltage of one phase or of opposite phase with respect to the voltage of the supply lines 60 and 61 is created between the terminals 115 and 116. It will be clear also that the amplitude of fluctuation of the pulsating voltage so produced between the terminals 115 and 116 is dependent upon the extent of deviation of the applied frequency from the value to which the discriminator 55 is tuned as will be readily apparent upon reference to the curve $E_0$ in Fig. 4. Inasmuch as the high frequency currents produced in the output circuit of the oscillator 54 are of substantially constant amplitude and are keyed at the frequency of the alternating voltage supplied by the lines 60 and 61, the pulsating voltage produced between the terminals 115 and 116 is of substantially a square wave form.

It will be evident that the invention in its practical application is not restricted to the use of a frequency discriminator of the type disclosed, inasmuch as other types, particularly those conventionally used for automatic frequency control and frequency modulation detection in radio broadcast receivers may be employed equally as well.

As shown in Fig. 2, the voltage amplifier and limiter 56 comprises one section 117 of a twin type tube, for example a commercially available type 7N7 tube, the other section of which comprises the rectifier 59. The section 117 includes an anode 118, a control grid 119, a cathode 120, and a heater filament 121. Energizing current is supplied to the heater filament 121 from the transformer secondary winding 64.

The input circuit of the triode section 117 is controlled in accordance with the resultant voltage drop between the terminals 115 and 116 and to this end the control grid 119 is connected directly to the terminal 115 and the terminal 116 is connected to the cathode 120 through a parallel circuit including a resistance 122 in one branch and a condenser 123 in the other branch. Direct coupling is chosen in preference to resistance-capacity coupling in order to minimize distortion of the square wave characteristic of the discriminator output voltage, although resistance-capacity coupling may be employed, if desired. It will be noted that the cathode 120 is connected through the parallel circuit 122, 123 to ground at G.

Anode voltage is supplied to the triode section 117 from the transformer secondary winding 65 through a circuit which may be traced from the positive terminal of the transformer secondary winding 65, as seen in Fig. 2, to the anode 68 of rectifier 59, the cathode 70, through the resistance 75 of the filter 72, a resistance 124, the anode 118 of the triode section 117, the cathode 120, and the parallel connected resistance 122 and condenser 123 back to the other end of the transformer secondary winding 65, which end is connected to ground at G.

The resistance 122 and parallel connected condenser 123 serve to bias the control grid 119 of the triode section 117 and are utilized for the purpose of maintaining the voltage of the control grid at a predetermined mean value when the fluctuating voltage output from the discriminator 55 is zero. This biasing circuit serves to provide proper biasing potentials as required for good amplification of small discriminator output or signal voltages. For discriminator output voltages in excess of a predetermined amplitude, the triode section 117 acts as a limiter due to anode current saturation and cut off. In this manner the characteristic of the voltage output from the discriminator 55 of varying in amplitude, that is, increasing to a maximum and then decreasing, as may be seen by reference to the curve $E_0$ of Fig. 4, is prevented from affecting the operation of the power amplifier 57 and motor 5.

The power amplifier 57 comprises a twin triode tube such as a type 7N7 tube. One triode of the power amplifier 57 includes an anode 125, a control grid 126, a cathode 127 and a heater filament 128, while the other triode includes an anode 129, a control grid 130, a cathode 131 and a heater filament 132. The control grids 126 and 130 are directly connected to each other and to a contact 133 which is in engagement with and adjustable along the length of a resistance 134. The resistance 134 is connected in series with a condenser 135 from the anode 118 of the voltage amplifier and limiter 56 to ground at G. The condenser 135 is provided for impressing the fluctuating component of voltage produced across the resistance 124 in the anode circuit of the voltage amplifier and limiter 56 on the input circuit of the power amplifier 57 while preventing the D. C. component of the anode circuit voltage of the voltage amplifier and limiter 56 from being impressed on said input circuit. The signal from the voltage amplifier and limiter 56 is impressed simultaneously and equally on both of the control grids 126 and 130 of the power amplifier 57. The adjustable resistance 134 is provided to facilitate adjustment in the gain of the power amplifier 57.

Anode voltage is supplied to the triodes of the power amplifier 57 from the transformer secondary windings 66 and 67. Specifically, the anode 125 is connected to the left end terminal of the winding 66 while the anode 129 is connected to the right end terminal of the winding 67. The cathodes 127 and 131 are connected together and through a biasing resistance 136 to ground G. The adjacent terminals of the transformer secondary windings 66 and 67 are connected together and through the control winding 24 of the motor 5 to ground G, and hence, through the biasing resistance 136 to the cathodes of the power amplifier 57.

As is illustrated more or less diagrammatically in Fig. 1, the reversible motor 5 is provided with a stator 21 having four pole pieces which are physically spaced apart by 90° and also includes a squirrel cage rotor 22 having interconnected conductor bars. The power winding 23 is wrapped around two of the opposite pole pieces of the stator and the control winding 24 is wrapped around the remaining two opposite pole pieces. When only the power winding 23 is energized the rotor 22 is not urged to rotation in either direction and remains stationary. When the control winding 24 is energized and the voltage and current therethrough lead the voltage and current, respectively, in the power winding 23, the rotor 22 is actuated for rotation in one direction, for example, in a counter-clockwise direction. When the voltage and current in the control winding 24 lag the voltage and current, respectively, in the power winding the rotor 22 rotates in the opposite direction.

The motor 5 is preferably so constructed that the control winding 24 has a high impedance to match the impedance of the anode circuits of the power amplifier 57 when the rotor 22 is rotating at full speed. By providing a power winding having high impedance, increased efficiency of operation is obtained. Preferably the control and power windings of the motor have a high ratio of inductive reactance to resistance, for example, from 6 to 1 to 8 to 1 at the frequency of the alternating current supplied by the mains 60 and 61, namely 60 cycles per second. This provides for maximum power during running with the least amount of heating and also provides a low impedance path in the control windings for anti-hunting purposes. By so designing the motor, reduction in heating thereof during its stalled condition is also obtained.

Energizing current is supplied to the power winding 23 of the motor 5 through a circuit which may be traced from the alternating current supply conductor 60 through a condenser 137 and the power winding 23 back to the supply conductor 61. The condenser 137 is so chosen with respect to the inductance of the power winding 23 as to provide a substantially series resonant circuit when the rotor 22 of the motor is rotating at approximately full speed. By virtue of this series resonant circuit the total impedance of the power winding circuit is substantially equal to the resistance of the power winding 23. Inasmuch as this resistance is relatively low a large current flow through the power winding is made possible, resulting in the production of maximum power and torque by the motor. Due to the series resonant circuit, also, the current flow through the power winding 23 is substantially in phase with the supply line voltage. The voltage across the power winding 23, however, leads the current flow by substantially 90° because of the inductance of the power winding.

When the rotor 22 is operating at a substantially maximum speed, the apparent inductance of the power winding is a maximum whereupon the series resonant circuit is resonant to the applied 60 cycles per second alternating current from the supply lines 60 and 61. As the speed of rotation of the rotor 22 decreases, the apparent inductance of the power winding 23 decreases, and consequently, disturbs to some degree the resonant condition. This causes a slight phase shift in the current through and the voltage across the power winding, the voltage shifting somewhat more than the current, and therefore reducing the power loss in the power windings. Moreover, the change from the resonant condition reduces the current flow through the power windings and because of the decrease in apparent inductance the voltage across the power windings also decreases. This produces a further reduction of power loss in the power windings. As a result, there is a substantial reduction of heating of the power windings when the rotor 22 is at rest as compared to the condition when the rotor is operating at substantially full speed.

Power is supplied to the control winding 24 from the transformer secondary windings 66 and 67 through the anode circuits of the twin triodes of the power amplifier 57 through the circuits previously traced. A condenser 138 is connected in parallel with the control winding 24 and is so selected as to provide a parallel resonant circuit during both the stalled and running conditions of the motor. This parallel resonant circuit presents a relatively high external impedance and a relatively low internal impedance. The relatively high external impedance of the parallel resonant circuit matches the impedance of the anode circuits of the power amplifier triodes, and hence, provides for optimum conditions of operation. The relatively low internal circuit impedance of the control winding 24 and the condenser 138 approximates the actual resistance of the control winding 24, and inasmuch as this resistance is relatively low the impedance of the internal circuit is also relatively low, making possible a large current flow through the control winding.

The transformer secondary windings 66 and 67 are so wound on the transformer 58 that the anode 125 of one triode of the power amplifier 57 is driven positive during one-half cycle of the alternating current supply voltage. For convenience of explanation, this half cycle will be referred to hereafter as the first half cycle. The anode 129 of the other triode is driven positive during the opposite or second half cycle, and therefore, during the first half cycle when the anode 125 is positive with respect to the junction point of the secondary windings 66 and 67, the anode 129 is negative with respect to that junction point. During the second half cycle the anode 129 becomes positive with respect to the junction point of the windings 66 and 67 while the anode 125 becomes negative with respect to the potential of that junction point. The voltage on the anode 125 accordingly increases and decreases in phase with the supply line voltage and the voltage on the anode 129 increases and decreases 180° out of phase with the supply line voltage. This relation always remains substantially the same.

When the rate of fluid flow through the conduit 1 remains constant at the desired value, no adjustment is made to the tuning of the detuning means 3, and consequently, the frequency of the high frequency current output from the oscillator 54 is maintained at the frequency to which the frequency discriminator 55 is tuned, namely at 450,000 cycles per second. No voltage is then produced across the frequency discriminator output terminals 115 and 116, and therefore, the voltage of the control grid 119 of the voltage amplifier and limiter 56 remains constant and the voltage of the control grids 126 and 130 of the power amplifier 57 also remains constant. Under these conditions current flows from the anode 125 to the cathode 127 during the first half cycle of the supply line voltage when the anode 125 is positive, but current will not flow in this circuit during the second half cycle of the supply line voltage. Pulses of current pass between the anode 125 and the cathode 127, therefore, during alternate half cycles of the supply line voltage. These pulses of current pass through the control winding 24.

During the first half cycle when the anode 129 is negative no current will flow from the anode 129 to the cathode 131, but during the second half cycle when the anode 129 is positive a pulse of current will flow from the anode 129 to the cathode 131 and this pulse of current will also pass through the motor control winding 24. Inasmuch as the control grids 126 and 130 are directly connected together and the voltages of these control grids are identical the power amplifier 57 produces pulses of current of equal magnitude through the control winding 24 during each half cycle of the supply line voltage. The parallel resonant circuit formed by the control winding 24 and the condenser 138 provides a high external impedance which is substantially resistive in character, and accordingly, a pulsating voltage drop in phase with the anode current flows of the triodes of the power amplifier 57 is produced across the control winding 24 by the flow of pulsating anode current through the parallel resonant circuit. The pulsating voltage across the control winding 24 produces a current through the winding which includes a D. C. component and an alternating component having a fundamental frequency of twice the frequency of the alternating current supply mains 60 and 61, namely 120 cycles per second.

Due to the inductance of the control winding 24, the current flow through the control winding lags the voltage across the winding by substantially 90° of the 120 cycle voltage or by 45° of the 60 cycle voltage. The condenser 138 connected in parallel with the control winding 24 operates to maintain the D. C. component of the current flow through the control windings at a substantially steady value, and also provides a low impedance path for the 120 cycle component of the current flow in the control winding. Since the control winding has a low resistance, the D. C. component flowing through the control winding is relatively great while the amplitude of the alternating current flowing through the control winding is relatively small because of the high inductance of the control winding. Due to the relatively high D. C. component of current through the control winding, the core structure tends to become saturated with the result that the inductive reactance of the control winding 24 is relatively small. The condenser 138 is so selected with respect to this inductive reactance at 120 cycles that the condenser 138 in parallel to the control winding 24 provides a substantially parallel resonant circuit.

The relatively large D. C. current and 120 cycle current flowing through the control winding 24 under these conditions act to retard rotation of the rotor 22. Specifically, rotation of the rotor causes its conductor bars to cut flux produced by the D. C. and 120 cycle components of current flowing through the control winding 24 and this action creates a relatively heavy current through the conductor bars which quickly expends the force urging the rotor to rotation, and hence, provides an efficient braking action.

It is noted that during the alternate half cycles of the 120 cycle voltage the A. C. component of the current flowing through the control winding has both a high peak and a low peak. The high peak and the low peak of each half cycle of the 120 cycle component cancel each other and therefore do not provide any turning effort on the rotor 22. While the 120 cycle component of the current through the control winding does not create any tendency for the rotor 22 to rotate, this component of current acts, similarly to the D. C. current component, to retard rotation of the rotor 22. Rotation of the rotor 22 causes its conductor bars to cut flux produced by the 120 cycle current component through the control winding and this also produces a relatively heavy current in the rotor conductor bars which acts quickly to expend the force urging the rotor to rotation.

The amount of braking action exerted on the rotor 22 is determined by the magnitude of the D. C. and 120 cycle current components flowing through the control winding 24. Hence, the braking action may be increased or decreased by varying the amounts of D. C. current flow and 120 cycle current flow. Such variation may be accomplished in various ways, for example, by connecting other power amplifier tubes in parallel with the power amplifier tubes including the anodes 125 and 129 for supplying an increased amount of D. C. current and 120 cycle current to the control winding or by selecting other types of tubes to provide the desired D. C. current flow and 120 cycle current flow to the control winding 24. Variation in the braking action may also be accomplished by changing the value of the biasing resistance 136 in the power amplifier 57. Thus the amount of braking action may be increased by decreasing the value of the biasing resistance 136 and conversely the amount of braking action may be decreased by increasing the value of resistance 136. It is noted, however, that if the resistance value of the biasing resistance 136 is decreased too much the plate current flow through the power amplifier tube will be increased to a large value which is inconsistent with long life of the tube. Preferably, a compromise selection of the biasing resistance 136 should be made to give the desired amount of braking consistent with long life of the tube and proper biasing of the control grids of the tube.

From the foregoing explanation it will be clear that under balanced conditions the motor 5 remains stationary and any tendency for the rotor 22 to rotate is rapidly eliminated by the braking action obtained.

Upon a small increase in the rate of fluid flow through the conduit 1, the manometer 2 operates the detuning means 3 to give a slight adjustment to the condenser plate 19 in the clockwise direction to decrease its capacity. This produces a small increase in the frequency of oscillation of the oscillator 54 from its center frequency of 450,000 cycles per second. Inasmuch as this frequency of the high frequency current output from the oscillator 54 does not correspond to the frequency to which the discriminator 55 is tuned, a 60 cycle per second component of fluctuating output voltage is produced between the terminals 115 and 116. That fluctuating component of voltage is in phase with the voltage of the supply lines 60 and 61 and is applied to the input circuit of the voltage amplifier 56 to cause the voltage of the control grids 126 and 130 of the power amplifier 57 to fluctuate 180° out of phase with the supply voltage. Since the change in the rate of fluid flow through the conduit 1 is small, the amplitude of the fluctuating output voltage of the discriminator 55 is also small and is amplified by the voltage amplifier and limiter 56. Accordingly, the amplitude of fluctuation of the voltage of control grids 126 and 130 of the power amplifier 57 is relatively small.

With this signal impressed on the control grids 126 and 130 of the power amplifier 57, the pulsating D. C. anode current flowing during the first half cycle will be decreased since the voltage of the control grids is driven negative during the first half cycle. The pulsating D. C. anode current flow during the second half cycle will be increased because the voltage of the control grids is driven in the less negative or positive direction during the second half cycle. The decrease in magnitude of the pulsating anode current flow during the first half cycle decreases the magnitude of the pulsating voltage produced across the motor control winding 24 during the first half cycle and the increase in the anode current flow during the second half cycle causes the voltage pulse across the motor control winding to increase during the second half cycle. Due to cooperation of the condenser 138 and the control winding 24, the voltage across the latter decreases during the first half cycle at a faster rate than the voltage increases during the second half cycle. Symmetry in the 120 cycle pulsating voltage across the control winding 24 vanishes, therefore, and a 60 cycle alternating component of voltage is produced instead across the control winding.

When the 120 cycle component of current through the control winding 24 begins to vanish, the D. C. component of current through the control winding also begins to decrease, and consequently, the braking action exerted on the rotor 22 is reduced.

The high peaks of the 60 cycle per second alternating component of voltage produced across the control winding occur during the second half cycles of the supply line voltage and lead the high peaks of the voltage across the power winding 23 by approximately 90°. Accordingly, the rotor 22 is urged to rotation in one direction, for example, the counter-clockwise direction.

The speed of rotation of the motor in the counter-clockwise direction depends upon the amplitude of the alternating voltage across and the alternating current flowing through the control winding 24, and also depends upon the magnitudes of the D. C. current and the 120 cycle current flowing through the control winding. Consequently, when the increase in flow in the conduit 1 is relatively small, the motor 5 will operate in a counter-clockwise direction at a relatively low speed.

When the rate of fluid flow through the conduit 1 increases a larger amount, the manometer 2 operates the detuning means 3 to give a greater adjustment to the condenser plate 19 in the clockwise direction to decrease further the condenser capacity. This causes the oscillator 54 to increase its frequency of oscillation a larger amount than in the case first considered. Since this frequency does not correspond to the tuning of the discriminating means 55 and constitutes a larger frequency deviation than that taking place upon the occurrence of the smaller change in fluid flow in conduit 1, the discriminator produces a 60 cycle per second output voltage of relatively large amplitude. That fluctuating output voltage, also in phase with the supply voltage, is applied to the control grid 119 of the voltage amplifier and limiter 56 to cause the voltages of the control grids 126 and 130 to fluctuate 180° out of phase with the supply voltage. Since the amplitude of the fluctuating output voltage of the discriminating means 55 is relatively large, the amplitude of fluctuation of the grids 126 and 130 of the power amplifier is also relatively large. Due to the action of the voltage amplifier and limiter 56, the amplitude of the fluctation of the voltage applied to the grids 126 and 130 does not increase for greater excursions of the oscillator ouput frequency from the value to which the discriminating means 55 is tuned. In other words, when the frequency of oscillation of the oscillator 54 increases above 451,000 cycles per second, for example, the amplitude of fluctuation of the voltage applied to the grids 126 and 130 of the power amplifier 57 does not increase above the maximum value.

With this signal placed upon the grids 126 and 130 of the power amplifier 57, the pulsating D. C. anode current, during the first half cycle, will be decreased to zero since the voltage of the grids is driven so far negative during the first half cycle that no current flows through the anode circuit during the first half cycle. The pulsating D. C. plate circuit, during the second half cycle, will be increased since during the second half cycle the voltages of the grids are driven still further in the less negative direction. Accordingly, when the rate of flow through the conduit 1 increases a large amount, no current flows in the output circuit of the power amplifier 57 during the first half cycle and maximum current flows through that output circuit during the second half cycle.

With this pulsating D. C. current flowing in the output circuit of the power amplifier 57, the voltage across the motor control winding 24 during the first half cycle decreases to a minimum and increases to a maximum during the second half cycle. Consequently, the voltage across the control winding assumes a 60 cycle alternating pattern which is 180° out of phase with the supply voltage due to the cooperation of the condenser 138 and the control winding 24. The alternating voltage across the control winding 24 leads the alternating voltage across the power winding 23 by approximately 90°.

The decrease in anode current to zero during the first half cycle and the increase of the anode current to a maximum during the second half cycle causes the current flow through the control winding 24 to have a frequency of 60 cycles, the current flow through the control winding lagging by 90° the alternating voltage across the control winding. The alternating current flowing through the control winding leads the alternating current flowing through the motor power winding 23 by approximately 90°.

Accordingly, when the rate of flow through the conduit 1 increases a relatively large amount, the amplitude of the 60 cycle alternating current flowing through the motor control winding 24 is increased to a maximum and the D. C. current and 120 cycle current flowing through the motor control windings are decreased to a minimum. This causes faster operation of the motor 5 since the turning effort of the motor control and power windings on the rotor 22 is increased while the braking action is decreased.

Upon a decrease in the rate of fluid flow through the conduit 1 the operation is substantially the same as that described above except that the motor 5 is operated in the clockwise direction instead of the counter-clockwise direction. Specifically, upon a decrease in the rate of flow through the conduit 1, for example, a small decrease, the manometer 2 operates the detuning means 3 to slightly move the condenser plate 19 in a counter-clockwise direction to increase the condenser capacity. This causes the oscillator 54 to decrease its frequency of oscillation by a small amount. Since this frequency value does not correspond to the tuning of the discriminating means 55, the latter produces a fluctuating output voltage fluctuating at the low frequency oscillation of 60 cycles per second and which is of relatively small amplitude inasmuch as the decrease in frequency of oscillation of the oscillator 54 was small. That fluctuating output voltage, moreover, is 180° out of phase with the supply voltage and is applied to the control grid 119 of the voltage amplifier and limiter 56 to cause the voltages of the control grids 126 and 130 to fluctuate in phase with the supply voltage.

If the amplitude of the fluctuating output voltage of the discriminating means 55 is relatively small, the amplitude of fluctuation of the voltage applied to the grids 126 and 130 of the power amplifier 57 is also relatively small. When the amplitude of the fluctuating output voltage of the discriminating means 55 increases to a large value, however, due to the oscillator 54 oscillating at a still lower frequency with respect to its center frequency, the amplitude of the fluctuating voltage applied to the grids 126 and 130 is relatively large. Any further increase in the extent of departure of the frequency of the oscillator 54 from its center frequency, 450,000 cycles per second, does not cause a corresponding increase in the amplitude of fluctuation of the control grids 126 and 130 of the power amplifier, however, because the voltage amplifier and limiter operates on the occurrence of such larger frequency excursions to clip the peaks of the fluctuation.

With these in-phase signals applied to the grids 126 and 130 of the power amplifier 57, the anode current through the motor control winding 24 increases during the first half cycle and decreases during the second half cycle. This produces a voltage across the control winding 24 which is in phase with the supply line voltage. Under these conditions, also, a current is caused to flow through the control winding having a 60 cycle A. C. component which lags the A. C. current in the motor power winding 23 by substantially 90°. The voltage across the control winding 24 also lags the voltage across the power winding 23 by substantially 90°. This causes rotation of the motor 5 in a clockwise direction. Here, as in the case first considered, the D. C. component of the current and the 120 cycle A. C. component of the current through the control winding gradually decrease and the 60 cycle component of the current gradually increases to control the speed of the motor 5 in accordance with the magnitude of the decrease in frequency of the oscillator output current from the value to which the discriminating means is tuned.

The motor 5, therefore, operates in one direction or the other accordingly as the frequency of oscillation of the oscillator 54 increases or decreases with respect to the value to which the discriminating means is tuned, and the speed of the motor 5 in either direction is directly dependent, within a predetermined range, upon the magnitude of the increase or decrease in the frequency of oscillation of the oscillator 54.

When the motor 5 is operated at maximum speed, the inductance of the control winding 24 increases because the D. C. current then flowing through the control winding is at a minimum. Also at this time the alternating current flowing through the control winding is completely a 60 cycle alternating current instead of the 120 cycle current flowing through the motor control winding when the motor is stationary. Due to this decrease in frequency and due to the increase in inductance in the control winding 24 when the motor is operating at maximum speed, the condenser 138 connected in parallel with the control winding, still provides a parallel resonant circuit so that the impedance offered by this parallel circuit is substantially resistive to maintain the anode voltage of the power amplifier 57 in phase with the anode current. As pointed out above, a resonant condition exists when the motor is stationary so that under that condition the anode voltage and anode current are also in phase. Proceeding from the condition wherein the motor is stationary to the condition wherein the motor is operating at maximum speed, the circuit formed by the condenser 138 being connected in parallel with the control winding, remains substantially resonant so that the anode current and the anode voltage are substantially always in phase.

As the rotor 22 of the motor 5 rotates, the flux produced by the power winding 23 is distorted by the rotor rotation to cause some of the flux produced by the power winding to link the control winding 24. This induces additional voltage in the control winding 24 which is of the same phase and frequency as the voltage normally produced therein to assist that voltage in the control winding 24. This induces current in the control winding through the low resistance local path of the parallel resonant circuit thereby establishing a relatively large current flow even though only a few turns of the control winding are linked by the distorted flux. The greater portion of the current, and hence, the power for the control winding when the motor is operating at maximum speed, is induced by this transformer action so that the tube of the power amplifier 57 need only conduct a relatively small portion of the total current or power required to energize the control winding 24. The amount of current induced by this transformer action is proportional to the speed of rotation of the rotor 22. This action tends to increase the life of the tube of the power amplifier 57. For a further detailed description of the construction and mode of operation of the motor 5 and the power amplifier 57, reference is made to the aforementioned W. P. Wills patent.

Counter-clockwise rotation of the rotor 22, caused by an increase in frequency of the oscillator output current above the frequency to which the discriminating means 55 is tuned, operates through the gear 28, cable drum 29, cable 30, and cable drum 34 to adjust the retuning means 6 by rotating the condenser plate 38 in a clockwise direction to increase its capacity. Increasing the capacity of the retuning means 6 decreases the frequency of oscillation of the oscillator 70 to the original value of 450,000 cycles per second, whereupon rotation of the rotor 22 is stopped. Also, clockwise rotation of the rotor 22, caused by a decrease in the frequency of oscillation of the oscillator 54, operates through the gear 26, cable drum 29, cable 30, and cable drum 34 to adjust the retuning means 6 in the opposite direction by rotating the condenser plate 38 in a counter-clockwise direction to decrease the capacity of the latter. This causes the frequency of oscillation of the oscillator 54 to increase to the original value of 450,000 cycles per second, whereupon rotation of the rotor 22 is stopped. As the frequency of oscillation of the oscillator 54 is returned by the retuning means 6 to the original value, 450,000 cycles per second corresponding to the frequency to which the discriminating means is tuned, the braking action of the motor 5 is increased so that the rotation of the motor 5 is quickly stopped when the frequency of the oscillator 54 reaches the desired value, without the occurrence of "hunting."

Consequently, the gear 26 meshing with the pinion gear 25, operated by the rotor 22, assumes a position corresponding to the angular relation of the condenser plates 19 and 20 of the detuning means 3, and hence, in accordance with the operation of the manometer 2. Because of the square power relationship existing between the differential pressure in the manometer 2 and the rate of flow through the conduit 1, the retuning means 6 may be so constructed as to eliminate this square power factor and, if this is done, the angular position of the gear 26 will vary linearly with the actual rate of flow through the conduit 1. The indicating pointer (not shown) operated by the shaft 27 from the gear 26, and the pen arm 43 operated through the gear sector 41 and gear 40 by the gear 26, assumes angular positions corresponding to the position of the gear 26, and hence, corresponding to the angular adjustment of the detuning means 3, the differential pressure in the manometer 2, and the rate of flow through the conduit 1 for indicating and recording the rate of flow through the latter. The indicating scale cooperating with the indicating pointer (not shown) and the slowly rotating chart 44 cooperating with the pen arm 43 may be suitably calibrated for indicating the rate of flow through the conduit 1. If the characteristics of the retuning means 6 correspond to the characteristics of the detuning means 3, then the indicating scale and chart may be calibrated in accordance with those characteristics or in accordance with the characteristics of the manometer 2. Even graduations on the chart and indicating scale would indicate, therefore, the differential pressure existing within the manometer 2 and, in order to indicate and record the rate of flow through conduit 1, the chart and scale must have square root calibration. If, however, it is desired to have a straight line calibration on the chart and scale for indicating the rate of flow through the conduit 1, the retuning means 6 may be characterized to eliminate the square power junction, as by suitable configuration of the condenser plates 38 and 39 with respect to each other.

In order to facilitate adjustment of the zero point of the pen 43 with respect to the chart 44 for a given rate of flow through the conduit 1, the variable condenser 86 may be utilized, the variable condenser 86 being operative when adjusted to set the relation between the detuning means 3 and the retuning means 6 at which the oscillating current output of the oscillator 54 is at its center frequency.

Since the gear sector 41, operated by the gear 26, is positioned in accordance with the rate of fluid flow through the conduit 1 or other variable condition under measurement, the control apparatus 8 is operative to position the control valve 9 for maintaining the desired rate of flow through the conduit 1 or for maintaining constant such other variable condition.

The abutment 28, carried by the gear 26, engages the drive pinion 25 when the gear 26 is rotated to either extreme position. In engaging the drive pinion 25 the abutment 28 stalls the motor 5 and prevents over-travel of the returning means 6 and over-travel of the pen arm 43 and indicating pointer (not shown). Due to the relatively high inductive reactance to resistance ratio of the motor 5 and due to the lack of transformer action when the motor is stalled, it is found that, when the motor is thus stalled, the current flow through the motor is less than when it is running so that the motor 5 does not heat up under these stalled conditions. By reason of this arrangement, the need for limit switches or equivalent devices for stopping operation of the motor 5 is entirely eliminated.

In order to permit rapid operation of the motor 5 and still prevent "hunting," the response of the motor 5 must be correlated with the unbalancing and rebalancing operations of the oscillator system. The need for such correlation is especially pronounced when the range of operation of the oscillator system is changed. Correlation is accomplished by adjusting the sensitivity adjustment between the voltage amplifier and limiter 56 and the power amplifier 57. By moving the contactor 133 upwardly along the length of resistance 134 the amplitude of swing of grids 126 and 130 is increased and, by moving the contactor 133 downwardly the amplitude of swing is decreased. This, accordingly, adjusts the sensitivity of the electronic apparatus 4 whereby the response of the motor 5 may be exactly correlated with the action of the oscillator system. The amplifiers 56 and 57 may, therefore, be universally applied for use with various oscillator circuits 54 regardless of the operating range of such circuits.

As those skilled in the art will understand, my present invention in its practical application is not restricted to the use of a variable condenser 3 for detuning the oscillator 54 in response to a change in the fluid rate of flow through the conduit 1 or in the particular variable condition under measurement, and also is not restricted to the use of a variable condenser 6 for retuning the oscillator 54. For example, the detuning and retuning adjustments of the oscillator 54 may be effected solely by means of variable inductive reactance elements, by a combination of capacitive and inductive reactance elements, or by means of a single condenser as well as by the two parallel connected capacitive reactance elements shown in Figs. 1 and 2.

In some applications, as those skilled in the art will understand, the primary sensitive elements employed or available for detecting changes in the condition under measurement do not readily lend themselves to rotating a condenser rotor through a substantial angular rotation or for otherwise accomplishing a substantial variation in capacitance. Therefore, in order to facilitate use of the apparatus of the present invention with such a primary sensitive element, for example, one which makes available a short travel only, the primary sensitive element may be used to move a high frequency iron core in a coil to vary the frequency of oscillation of oscillator 54.

Three ways which may advantageously be employed for detuning and retuning the oscillator 54 are shown, merely by way of illustration, in Figs. 6, 7 and 8.

In Fig. 6 a variable condenser 3 is provided for detuning the oscillator 54 and the retuning adjustments of the oscillator are accomplished by variation in the magnitude of a parallel connected variable inductance device 85' comprising a high frequency inductance coil having a relatively movable core which may be made up of powdered iron of high permeability held together by a suitable binder. Such variable inductance devices are commercially available. The reactance 85' is disposed in inductive relation with the coil 87 for providing the feedback action of the oscillator 54 and is of the proper value required to cause the oscillator to oscillate at the desired frequency. The inductance coil and powdered iron core are arranged to be moved relatively to each other upon rotation of motor 5, and to this end the shaft of motor 5 is mechanically connected in any convenient manner to the reactance 85' so that upon rotation of rotor 22 in one direction the core and coil will be moved relatively to each other in one direction, and upon rotation of rotor 22 in the other direction the core and coil will be relatively moved in the opposite direction. It will be understood that, if desired, detuning of the oscillator 54 may be accomplished by variation of the inductance device 85' in correspondence with the changes in the measured condition and retuning may be effected by variation of the condenser 3 by the motor 5.

In Fig. 7 the detuning and retuning operations of the oscillator 54 are both accomplished by means of a high frequency variable inductance device 85" which, as shown, is shunted by a fixed condenser 3'. The inductance device 85" comprises an inductance coil and two relatively movable cores each of which may be made up of powdered iron of high permeability held together by a binder. It is contemplated that upon change in the variable condition under measurement the coil and one of the cores may be relatively moved to vary the inductive reactance of the device 85", and thereby, the frequency of oscillation of oscillator 54, and upon resulting operation of the motor 5 the coil and the other of the cores will be moved to restore the inductive reactance of the device 85" to its original value whereupon the frequency of oscillation of the oscillator 54 will also be restored to its original value.

In Fig. 8 the detuning and retuning operations of the oscillator 54 are effected by means of a single condenser 3" having two sets of plates 19' and 20', both of which are movable. The sets of plates 19' and 20' may each comprise only a single plate or a number of plates, as desired. In this modification, the set 19' is arranged to be moved relatively to the set 20' in response to a change in the condition under measurement to vary the frequency of oscillation of oscillator 54, and the set 20' is arranged to be moved relatively to the set 19' by the motor 5 as required to restore the frequency of oscillation of oscillator 54 to its original value.

As those skilled in the art will understand, this modification of my invention has particular utility in torque amplifying applications. Thus, one of the condenser plates 19' or 20' may be mounted on a sensitive and delicate rotatable shaft and the other of the condenser plates may be mounted on or rotated by the shaft of reversible motor 5. With such arrangement the changes in the angular position of the condenser plate driven by the sensitive and delicate shaft will be accurately followed by the other condenser plate, that latter of which is power driven by the motor 5. It is noted further that with this arrangement the angular distance through which the sensitive and delicate shaft is rotated, and through which the follow-up condenser is also rotated, is practically unlimited.

The measuring and controlling apparatus described in Figs. 1 through 8 is especially advantageous for use in those applications in which the detuning variable capacitance or inductance and the retuning variable capacitance or inductance are positioned closely adjacent each other, that is to say, within a few feet of each other. When it is desired to locate the detuning means at a further distance from the retuning means, for example, up to 50 feet or more, the arrangement of Fig. 9 may be employed. As shown in Fig. 9, the detuning condenser 3, which is operated in accordance with the variations in the condition under measurement, may be located at a position remote from the retuning means 6 and the remainder of the electronic apparatus 4, and a single co-axial cable 139 of suitable characteristics may be employed to connect one terminal of the detuning condenser 3 to one terminal of the retuning condenser 6. The other terminals of the detuning and retuning condensers are connected to ground G through which the circuit between the condensers is completed.

Figure 10:
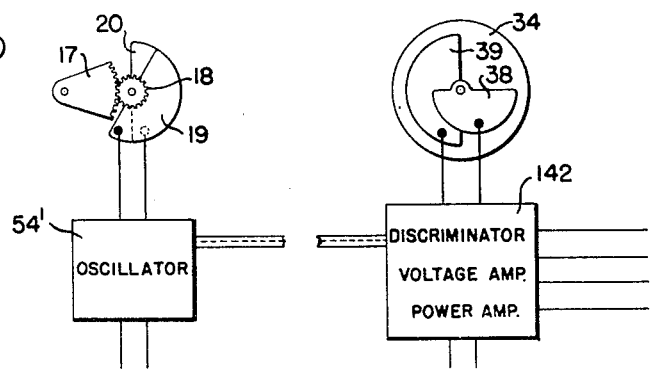
Fig. 10 is a partial diagrammatic illustration similar to Fig. 1 of another embodiment of the invention which is particularly useful for long distance telemetering.
Figure 11:
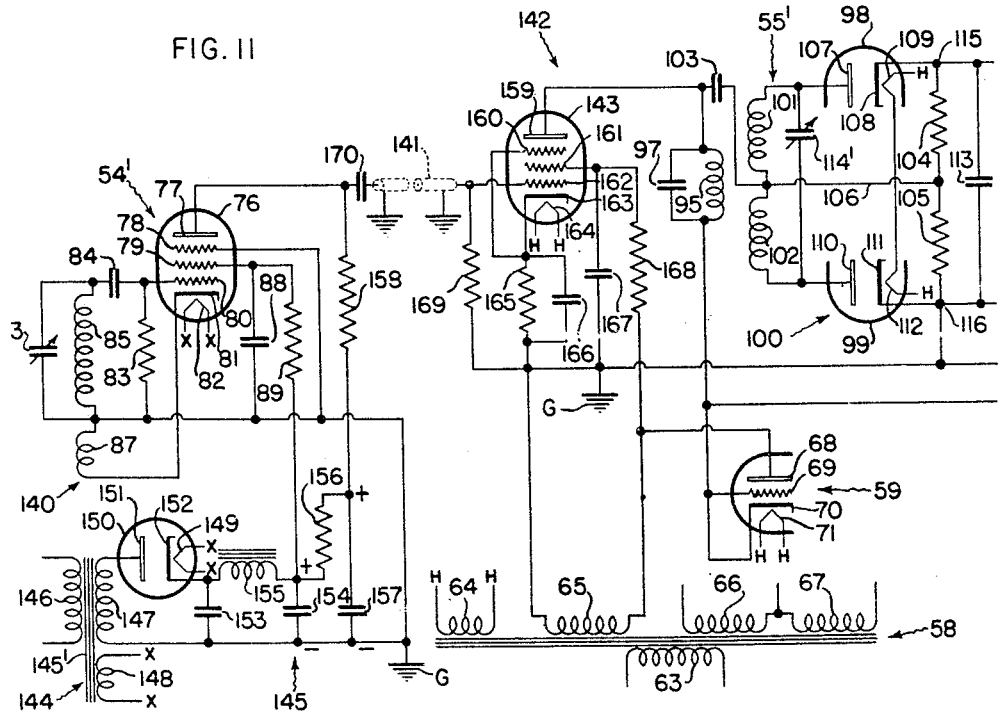
Fig. 11 is a wiring diagram illustrating a portion of the electrical circuit which is utilized in the apparatus of Fig. 10.

In Figs. 10 and 11 I have illustrated, more or less diagrammatically, a modification of the electronic apparatus 4 of the arrangement of Fig. 2 which has especial utility in applications wherein the distance between the detuning condenser 3 and the retuning condenser is too great to permit connection of both elements in a single frequency controlling circuit. With the arrangement of Figs. 10 and 11 the permissible distance between the detuning and retuning elements is unlimited. For convenience of illustration parts in Figs. 10 and 11 corresponding to those in the previously described figures have been designated by the same reference characters.

From solely theoretical considerations it is possible to couple in a long distance telemetering system two remotely located condensers in parallel relation in a parallel resonant circuit, as shown in Fig. 9, wherein one condenser is actuated by the primary sensitive element and the other condenser is actuated by the follow-up motor 5. The coupling member, however, necessarily includes a network, for example, a transmission line, whose characteristics enter into the determination of the resonant frequency. Since any transmission line possesses a certain amount of capacitance per unit length between its conductors, the permissible length of the transmission line is limited because the total capacitance of the line with long lengths becomes so great as to minimize the effect of capacity variations in the detuning and retuning means on the resonant circuit. Those characteristics do not remain constant, moreover, and vary with such unpredictable factors as temperature, humidity and the like. Hence, such unpredictable factors are detrimental to the stability and constancy of a telemetering system of the type shown in Fig. 9 when the distance between the detuning and retuning elements exceeds a predetermined maximum value of the order of 50 feet.

With the arrangement of Figs. 10 and 11 the difficulties encountered with the arrangement of Fig. 9 in long distance telemetering systems are overcome in that the operation of the motor 5 at the receiver is controlled solely in response to the frequency of a signal transmitted by way of a transmission line to the receiver from a remotely located transmitter at which the detuning means are located. As those skilled in the art will recognize, changes in the characteristics of the transmission line may influence and modify the amplitude and phase of the received signal, but will have no effect on its frequency. It will become evident as the description proceeds that the signal may be transmitted from the transmitter to the receiver by wireless transmission methods, if desired.

The arrangement of Figs. 10 and 11 comprises a transmitter 140 including in the frequency determining circuit of its oscillator 54' a variable detuning element or condenser 3 which is actuated by pressure, flow, temperature or any other variable condition under measurement. A high frequency oscillating current or signal is produced by the oscillator 54' and transmitted by the transmission line 141 to the receiver 142 located at a distance from the transmitter 140. At the receiver 142 the high frequency signal is amplified and modulated or keyed at the frequency of the alternating current supply mains 60 and 61 by an amplifying and modulating tube 143. The modulated high frequency signal is then impressed on the balanced frequency discriminator 55' which differs from the frequency discriminator 55 of Fig. 2 in that the tuning condenser 114' shown connected in parallel to the split secondary winding is variable for variably tuning the split secondary winding and to this end is mechanically coupled to the shaft of reversible motor 5. The tuning of the primary winding 95 of the discriminator is not critical and may be tuned to a frequency within or without the range of frequency variation of the split secondary winding. When the frequency of the high frequency modulated signal impressed on the discriminator 55' corresponds to the frequency to which the discriminator is tuned at the contemporaneous adjustment of condenser 114', no output voltage is produced between the discriminator output terminals 115 and 116, and consequently, the motor 5 remains at rest.

Upon deviation in the high frequency signal impressed on the discriminator from the frequency value to which the discriminator is tuned, a fluctuating output voltage, having the same frequency as that of the supply mains 60 and 61 and of one phase or of the opposite phase depending upon the direction of deviation of the high frequency signal, is produced between the discriminator output terminals 115 and 116. The amplitude of the discriminator output voltage is determined by the extent of deviation of the high frequency signal from the value to which the discriminator is balanced. The discriminator fluctuating output voltage is then amplified by means of a voltage amplifier and limiter 56 and the amplified quantity is applied to a power amplifier 57, as shown in Fig. 2, for selectively actuating the motor 5 for rotation in a direction corresponding to the phase of the discriminator output voltage.

The shaft of motor 5, as noted, is mechanically linked to the variable condenser 114' in the secondary side of the discriminator in such manner that motor rotation varies the capacitance of condenser 114' in the proper direction until the discriminator 55 is tuned to the new frequency value of the high frequency signal impressed on it from the transmitter 140. When the discriminator has been so adjusted, it is again balanced and the discriminator output voltage between the terminals 115 and 116 is reduced to zero whereupon the motor 5 comes to rest with the condenser 114' adjusted to a position corresponding to the new position of the condenser 3.

The oscillator 54' is generally like the oscillator 54 of Fig. 2, and differs therefrom only in that the frequency determining circuit includes only one variable element, namely the condenser 3, and also in that D. C. voltage instead of A. C. voltage is impressed on the screen 79. As shown, the frequency determining circuit includes the variable condenser 3, resistance 83, condenser 84 and inductance coils 85 and 87, all of which are connected between the control grid 80 and cathode 81 of the pentode tube 76 in the same manner as in the arrangement of Fig. 2. While a trimming condenser has not been shown connected in parallel with the condenser 114, it will be understood that such a trimming condenser may be employed, if desired, for providing a fine adjustment for zero setting of the instrument pen 43 and the indicating pointer contemplated but not shown. Such zero adjustment setting means are of particular utility when the retuning condenser has a straight line characteristic.

D. C. energizing voltage is supplied to the screen 79 and also to the anode 77 from a half wave rectifier designated generally at 144 through a suitable filter shown at 145. The half wave rectifier 144 includes a transformer 145' having a line voltage primary winding 146, a high voltage secondary winding 147, and a low voltage secondary winding 148 the terminals of which are connected to the filament 82 of the pentode 76 and to the filament 149 of a diode 150 for supplying the filament energizing currents. The terminals of the line voltage primary winding 146 are connected to a suitable source of alternating current of commercial frequency. That source of alternating current may or may not be the same source which supplies alternating current through the conductors 60 and 61 to the transformer 58 of the receiver. The diode 150 includes an anode 151 which is connected to one terminal of the transformer secondary winding 147 and a cathode 152 which is connected through the filter 145 and the screen and anode circuits of the tube 76 to the other terminal of the winding 147, which terminal, as shown, is grounded at G.

The filter 145 includes a pair of condensers 153 and 154 and a choke coil 155 for filtering the D. C. voltage applied to the screen 79 and includes a resistance 156 and a condenser 157 for further filtering the D. C. voltage applied to the anode 77. As shown, the screen 79 is connected through the resistance 89 to the positive filter terminal comprising the point of connection of choke coil 155 and resistance 156 while the anode 77 is connected through a resistance 158 to the positive filter terminal comprising the point of connection of resistance 156 and condenser 157.

The amplifying and keying tube 143 is shown as a pentode and may be of the commercially available 6SJ7 type including an anode 159, a suppressor grid 160, a screen grid 161, a control grid 162, a cathode 163, and a heater filament 164. Energizing current is supplied to the heater filament 164 from the low voltage secondary winding 64 of transformer 58. D. C. energizing voltage is impressed on the anode 159 from the transformer secondary winding 65 through a circuit which may be traced from the right end terminal of winding 65 to the anode of rectifier tube 59, the cathode thereof, the parallel connected primary winding 95 and condenser 97 of the frequency discriminator 55', anode 159, cathode 163, and a cathode biasing resistance 165 shunted by a condenser 166 to the other and grounded terminal of winding 65. The suppressor grid 160 is directly connected to the cathode 163. The screen grid 161 is connected through a condenser 167 to ground G and through a resistance 168 to the terminal of secondary winding 65 which is connected to the rectifier anode 68. The control grid 162 is connected through a resistance 169 to ground G and is also connected by the co-axial cable 141 and a condenser 170, the latter of which is located at the transmitter, to the anode of the oscillator tube 76.

Accordingly, the high frequency currents of variable frequency created by the oscillator 54' and transmitted between the transmitter 140 and the receiver 142 are impressed on the control grid 162 and are amplified by the tube 143. Inasmuch as the energizing voltage for the screen grid 161 is alternating, the tube 143 is conductive and anode currents flow only during those half cycles of the voltage supplied by the transformer secondary winding 65 when the screen 161 is positive. Consequently, the amplified quantity of the high frequency currents flowing through the discriminator primary winding 95 in the anode circuit of tube 143 are modulated at the relatively low frequency of the alternating current voltage supplied to the screen 161. This low frequency is that of the alternating current supply mains 60 and 61, and for example, may be 60 cycles per second.

The frequency discriminator 55' may be identical in construction to the discriminator 55 of the Fig. 2 arrangement except that the tuning condenser 114' for the split secondary winding is variable and is mechanically connected to the shaft of reversible motor 55 for adjustment in accordance with the angular position of the motor shaft. The mechanical linkage between the motor shaft and condenser 114' may be accomplished in any convenient manner, and for example, may be effected in the same manner as the motor is mechanically coupled to the retuning condenser 6 in the arrangement of Figs. 1 and 2.

Figure 12:
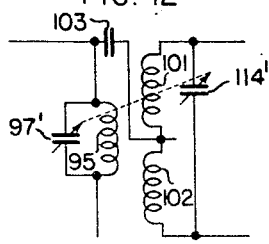
Figs. 12 and 13 are wiring diagrams illustrating various additional ways of retuning the electrical circuit shown in Fig. 11.
Figure 13:
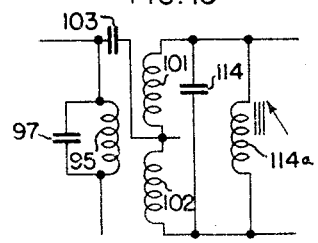

In Figs. 12 and 13 I have illustrated, more or less diagrammatically, two other ways in which the returning adjustments of the discriminator 55' to the frequency of the high frequency currents conveyed to the receiver 142 may be accomplished. As shown in Fig. 12, the tuning condenser 97' for the primary winding 95 is also made variable and is mechanically coupled to the variable tuning condenser 114' for the split secondary winding. With this modification both of the condensers 97' and 114' are simultaneously adjustable by the reversible motor 5 and are so related to each other and their associated circuits that the frequency to which the primary winding circuit is tuned is always identical to the frequency to which the secondary winding circuit is tuned. By coupling the primary winding tuning condenser 97' to the motor drive system in this manner, a substantial increase in the permissible width of the frequency range of variation at the transmitter is effected.

In the modification of Fig. 13 both the secondary tuning condenser 114 and the primary tuning condenser 97 are fixed in value and the tuning of the discriminator to the frequency of the high frequency currents received by the receiver 142 is effected by means of a variable inductance coil 114a connected in parallel to the condenser 114 and the split secondary winding, but shielded therefrom. The inductance coil 114a preferably is provided with an iron core consisting of powdered iron held together by a suitable binder similar to the iron cores of the arrangements of Figs. 6 and 7. In this modification the inductance coil 114a and the iron core are arranged to be moved relatively to each other under control of the motor 5 and to this end there is provided a suitable mechanical linkage between the shaft of the motor and the inductance coil or its associated core.

If desired, the condenser 114 connected across the split secondary winding of the discriminator may be made adjustable as by a suitable knob or screw adjustment means for the purpose of providing a ready and easily accessible means to adjust the width of the range or span over which the variable inductance 114a must be varied by the motor drive system as the detuning means 3, as seen in Fig. 11, is adjusted over its entire range. It will be understood that the functions of the condenser 114 and the variable inductance 114a may be interchanged when it is so desired. That is to say, the condenser 114, when variable, may be mechanically linked to the motor drive system for effecting the desired follow-up and balancing adjustments of the discriminator in response to a change in the capacity of the detuning condenser 3, and the desired span or range width adjustments may be accomplished by variation of variable inductance 114a.

Figure 14:
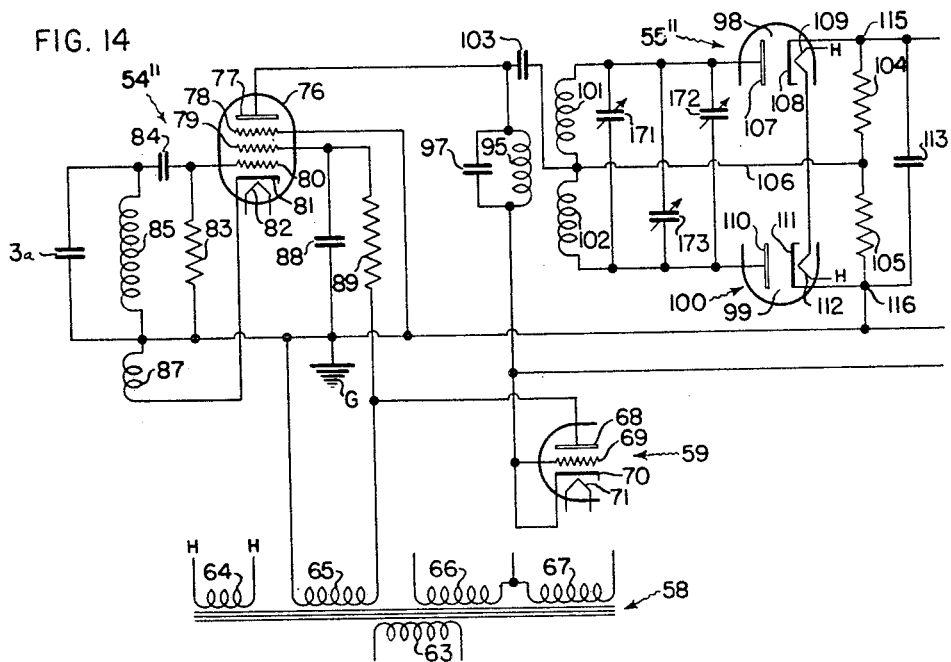
Fig. 14 is a wiring diagram illustrating a modification of the electrical circuit shown in Fig. 2.

In Fig. 14 I have illustrated, more or less diagrammatically, a further modification of the measuring and controlling instrument disclosed in Figs. 1 and 2 wherein the high frequency currents generated by the oscillator are maintained constant in frequency, or substantially so, and the operation of the motor drive system is initiated by variation in the frequency value to which the discriminator is tuned, and the motor operation is stopped by restoration of the frequency value to which the discriminator is tuned to the original value.

Specifically, as may be seen by reference to Fig. 14, an oscillator 54'' is provided for producing high frequency oscillating currents modulated at the low frequency of the alternating current supply mains 60 and 61. The oscillator 54'' is generally like the oscillator 54 shown in Fig. 2 but differs therefrom only in that the trimming condenser 86 has been omitted, and further that a frequency determining condenser 3a of fixed magnitude is provided in lieu of the variable condenser 3. Consequently, the frequency of the high frequency oscillating currents created by the oscillator 54'' remains substantially constant in this embodiment of my invention. The constant frequency high frequency current oscillations are modulated at the low frequency of the alternating current supply mains by energizing the screen grid 79 of the oscillator tube 76 from the transformer secondary winding 65, as in the Fig. 2 arrangement. D. C. energizing voltage, also, is supplied to the anode 77 of the oscillator tube 76 from the transformer secondary winding 65 through the rectifier 59.

The frequency discriminator 55'' is generally like that of Fig. 2 except that three variable condensers 171, 172 and 173 are provided in place of the fixed condenser 114. The condenser 171 may be mechanically linked to the manometer 2 in exactly the same manner that the detuning condenser 3 is linked thereto, and similarly, the condenser 172 may be mechanically linked to the motor drive system in the same manner employed to link the retuning condenser 8 to that system. Thus, upon variation in the rate of fluid flow through the conduit 1 and a consequent adjustment of condenser 171 resulting in adjustment of the frequency to which the discriminator is tuned from the frequency value of the high frequency currents generated by the oscillator 54'', the motor 5 will be energized for rotation and actuate the condenser 172 in the proper direction to restore the discriminator tuning to its original value. The variable condenser 173 is provided for the purpose of providing variation in the zero setting of the instrument pen and pointer.

Figure 15:
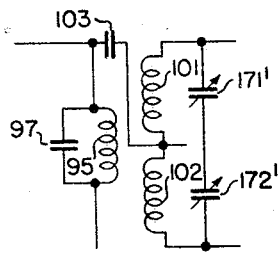
Figs. 15, 16, 17, 18 and 19 are wiring diagrams illustrating various additional ways of detuning and retuning the electrical circuit arrangements of Figs. 2 and 14.

Figs. 15 through 19 illustrate, more or less diagrammatically, various additional ways of detuning and retuning the discriminator of the electrical circuit arrangements of Figs. 2 and 14. In Fig. 15 the detuning and retuning adjustments are accomplished by condensers 171' and 172', respectively, which as shown, are connected in series with each other across the terminals of the discriminator split secondary winding. Condenser 171' is operatively connected to the manometer 2 and is variable in accordance with the direction and extent of differential pressure variations therein while the condenser 172' is operatively connected to the shaft of motor 5 and variable in accordance with the direction and extent of motor operation. With this modification the adjustments given the condensers 171' and 172' are such as to tend to maintain constant the total value of capacitance of the series connected condensers and thereby to maintain constant the frequency value to which the discriminator is tuned. Thus, for every position to which the condenser 171' is adjusted under control of the variable condition being measured, the condenser 172' is adjusted by motor 5 to a corresponding position.

Figure 16:
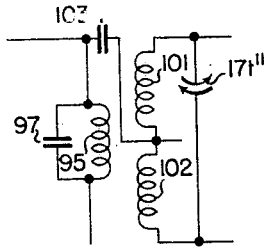

In the modification of Fig. 16 the detuning and retuning adjustments of the discriminator are accomplished by variation of a single condenser 171'' having two sets of associated plates, both of which are relatively movable similar to the condenser 3'' of Fig. 8. One set of plates is operatively connected to the manometer 2 or other variable condition under measurement while the second set of plates is operatively connected to the shaft of motor 5. The system is so arranged that upon deflection of the first set of plates in response to a condition change, the second set of plates is given a follow-up adjustment in the same direction by the motor 5. This modification of my invention, similar to that of Fig. 8, also has special utility for torque amplifying purposes.

Figure 17:
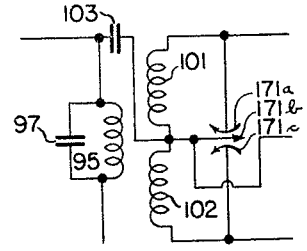

The modification of Fig. 17 is generally like that of Fig. 16 except that three sets of suitably shaped condenser plates 171a, 171b and 171c are provided to permit separate tuning of the opposite halves 101 and 102 of the discriminator split secondary winding. The set of plates 171b is connected to the center tap on the split secondary winding of the discriminator while the sets of plates 171a and 171c are each connected to an opposite end of the winding. Desirably, the set 171b of the condenser plates may be made stationary and the other two sets made movable relatively thereto. If desired, however, all three sets of plates may be made movable.

When the set 171b of the plates is stationary, the set 171a may be moved in accordance with the variable condition under detection and the set 171c may be moved by the motor 5 to follow the angular changes in position of the plates 171a, the direction of adjustment of the plates 171c being such as to restore and maintain the capacity between the plates 171c and 171b at a value substantially the same as that between the plates 171a and 171b so that the secondary winding section 102 will be tuned to precisely the same frequency as the secondary winding section 101.

As will be evident from the foregoing description and the previously described embodiments shown in Figs. 8 and 16, this modification of my invention may also be employed with advantage in a torque amplifying system as well as in a position follow-up system.

Figure 18:
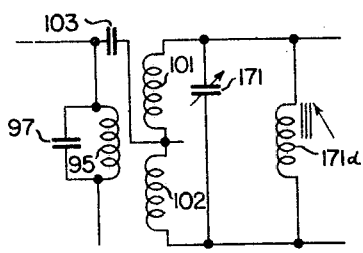

As illustrated in Fig. 18, the detuning adjustments of the discriminator may be effected by variation of a variable inductance 171d and the retuning adjustments may be effected by variation of a variable condenser 171, is so desired. Conversely, the detuning may be accomplished by variation of condenser 171 and retuning may be accomplished by variation of inductance 171d. The inductance 171d, which may be constructed in a manner similar to the inductance 114a of Fig. 13, comprises a coil into and out of which a core consisting of a powdered iron mass of high permeability is adapted to be moved to vary the inductance of the coil.

Figure 19:
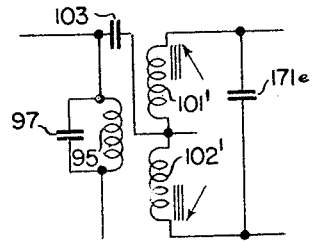

As shown in the modification of Fig. 19, the detuning adjustments may be effected by variation in the inductance of the split secondary winding section 101' while the retuning adjustments may be effected by variation in the inductance of the secondary winding section 102'. To the attainment of this end, the secondary winding sections are each provided with an iron core comprised of powdered iron suitably held together, which cores are arranged to be moved relatively to their associated section windings for accomplishing the desired detuning and retuning adjustments of the discriminator. A condenser 171e is connected in parallel to the split secondary winding for tuning purposes.

Upon change in the tuning of the discriminator due, for example, to a decrease in the inductance of the secondary winding section 101' following a change in the condition under detection, the motor 5 will be operated to actuate the core of section 102' in the proper direction relatively to the latter and by the proper amount to effect a corresponding reduction in the inductance of the section 102'. Upon an increase in the inductance of section 101', a corresponding increase in the inductance of section 102' will be made.

In Fig. 20 I have illustrated, more or less diagrammatically, another modification of the arrangement of Fig. 2 which may advantageously be employed in connection with the recording, indicating and controlling apparatus of Fig. 1. According to this embodiment of my invention, a high frequency oscillating current of predetermined and constant frequency is applied to the input terminals of a frequency discriminator during suitably short intervals alternating with intervals of similarly short duration in which a high frequency oscillating current normally of said predetermined frequency but variable therefrom is applied to the discriminator. Hence, with this modification, high frequency oscillating current is applied substantially continuously to the input circuit of the discriminator in contradistinction to the previously disclosed embodiments of my invention wherein high frequency oscillating currents are applied periodically to the discriminator.

It will be clear that when the frequencies of the two high frequency currents are said predetermined frequency, the output voltage from the discriminator will be zero, and consequently, the motor 5 will remain at rest. Upon increase in the frequency of the variable frequency oscillating current, however, an output voltage fluctuating at a low frequency corresponding to the duration of the aforementioned intervals and of one phase will be created at the discriminator output terminals, while a fluctuating voltage of said low frequency but of opposite phase will be produced at the discriminator output terminals upon a decrease in the frequency of the variable frequency oscillating current. The intervals during which each of the high frequency currents are applied to the discriminator may desirably be made 1/120 of a second in duration whereby the output voltage produced at the discriminator output terminals will fluctuate at 60 cycles per second. This output voltage of one phase or of opposite phase may then be readily amplified and limited by a voltage amplifier and limiter 56 and the amplified quantity applied to a power amplifier 57, as seen in Fig. 2, for selectively controlling the energization of motor 5 for rotation in one direction or the other depending upon the phase of the discriminator output voltage.

Specifically, as may be seen by reference to Fig. 20, an oscillator 54a is provided for producing the variable frequency oscillating currents and an oscillator 54b is provided for producing the oscillating currents of constant frequency. The oscillators 54a and 54b are generally like the oscillator 54 of Fig. 2 but differ from the latter in that the energizing voltage for the screen grid 79 of each oscillator is D. C. instead of A. C. In this respect, therefore, the oscillators 54a and 54b are like the oscillator 54' of Fig. 11. The D. C. screen grid and anode voltages for the oscillators 54a and 54b are shown in Fig. 20 as being obtained from a half wave rectifier 144 which may be identical to the correspondingly identified part of Fig. 11, although it will be understood that, if desired, these D. C. voltages may be obtained by means of the arrangement shown in Fig. 2 and including the diode 59 and the transformer secondary winding 65. As shown, suitable choke coils 174 are connected in the anode circuits of each of the oscillator tubes 76.

The frequency determining circuit of the oscillator 54a includes a detuning condenser 3 which is arranged to be operated by the manometer 2 in response to change in the rate of fluid flow in the conduit 1, and also includes a retuning condenser 6 arranged to be adjusted by the motor 5. The frequency determining circuit of the oscillator 54b includes a condenser 3' of fixed capacitance.

The frequency discriminator 55a is generally like the discriminator 55 of Fig. 2 but is different in that a choke coil 175 is connected in the conductor 106 between the point of connection of resistances 104 and 105 and the center tap on the split secondary winding, and also in that separate condensers 176 and 177 are provided in parallel to the resistances 104 and 105, respectively, in lieu of the single condenser 113. The operation of the discriminator 55a, however, is substantially the same as that of discriminator 55 of Fig. 2.

For the purpose of alternately applying at suitably rapid intervals the high frequency oscillating currents produced by the oscillators 54a and 54b on the discriminator input terminals, there is provided a vibrator or keyer 178 having a vibrating reed 179 and a pair of relatively stationary contacts 180 and 181. The reed 179 is connected directly to the upper terminal of the discriminator primary winding 95 and is connected through condenser 103 to the center tap on the split secondary winding. Contact 180 is connected through a condenser 182 to the anode 77 of the tube 76 included in oscillator 54b and contact 181 is connected through a condenser 183 to the anode 77 of the tube 76 of the oscillator 54a. A winding 184 and a cooperating permanent magnet 185 are provided for vibrating the reed alternately into and out of engagement with the contacts 180 and 181 and thereby for alternately impressing the high frequency currents generated by each of the oscillators 54a and 54b on the discriminator 55a. The winding 184 is connected to and is supplied with energizing current from the secondary winding 148 on transformer 145'.

The vibrator 178 may be of the type disclosed and claimed in the application filed on December 1, 1941, by Frederick W. Side and bearing Serial Number 421,176, now Patent No. 2,423,524, dated July 8, 1947. Fundamentally, it is a polarized switching mechanism, the operating winding 184 and the permanent magnet 185 cooperating to vibrate the reed 179 at the same frequency as the frequency of the alternating current supplied to the winding 184 by the transformer secondary winding 148, namely 60 cycles per second, when the primary winding 146 of transformer 145 is connected to the supply lines 60 and 61. In the operation of the vibrator, the reed 179 is in engagement with the contact 180 during one half cycle of the alternating current supplied winding 184 and is in engagement with the contact 181 during the other half cycle. Consequently, the reed 179 alternately engages first one and then the other of its associated contacts, remaining in engagement with each contact for a period of approximately 1/120 of a second.

In the balanced condition of this embodiment of my invention, the high frequency currents impressed on the discriminator 55a during the successive intervals of 1/120 of a second duration by each of the oscillators 54a and 54b are the frequency value to which the discriminator 55a is tuned, and consequently, zero output voltage is produced by the discriminator. Upon change in the adjustment of condenser 3 and thereby in the frequency of the high frequency currents created by oscillator 54a, however, an output voltage of one polarity or of the opposite polarity and of a magnitude depending upon the direction and extent of the change will be produced between the discriminator output terminals during the intervals in which the vibrator 179 applies the high frequency output current from the oscillator 54a on the discriminator input terminals. During the alternate intervals in which the vibrator 179 applies the high frequency output current from the oscillator 54b on the discriminator input terminals, zero output voltage is produced at the discriminator output terminals inasmuch as the frequency of the output current from oscillator 54b is maintained constant at the value to which the discriminator is tuned.

As a result, upon deviation in the frequency of the output current of oscillator 54a in one direction from the frequency value to which the discriminator 55a is tuned, an output voltage of one phase is produced at the discriminator output terminals 115 and 116, and upon deviation in the opposite direction an output voltage of opposite phase is there produced. This discriminator output voltage is utilized in a manner similar to that in which the discriminator output voltage in Fig. 2 is utilized to selectively control the rotation and direction of rotation of motor 5 and thereby the adjustment of condenser 6 as required to restore the frequency of the output current of oscillator 54a to the value to which the discriminator 55a is tuned. Such adjustment of the condenser 6 restores the state of balance of the system whereupon the motor 5 will come to rest with the recording pen and indicating pointer at a position corresponding to the adjustment of condenser 3.

While my invention has been described in connection with flow measuring and/or controlling apparatus and with torque amplifying apparatus, it will be apparent to those skilled in the art that the various apparatus embodiments disclosed are not limited to such use and may be employed for many other purposes wherein it is desired to detect changes in a variable capacitance or inductance and to operate indicating, recording or controlling apparatus in response to such capacitance or inductance variations whether at a local or remote point. Thus, my invention may be employed to advantage in indicating and recording variations in such variable conditions as temperature, pressure, liquid level and the like, and may also be employed to advantage for telemetering, boat steering, remote control, repeater positioning and the like purposes.

It is noted that for the purposes of the present invention the modulating or keying of the high frequency current at the frequency of the low frequency current need not be 100% amplitude modulation and that the various embodiments of the invention disclosed will also operate satisfactorily if the modulation is less than 100%. For most efficient operation, however, it is desirable for the high frequency current to be substantially 100% modulated or keyed with a square wave. When the high frequency current is so modulated or keyed, the greatest possible voltage output of one phase or the opposite phase is produced across the discriminator output terminals 115 and 116 for a given change in the adjustment of the detuning means.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described my invention, what I claim as new and desire to secure by Letters Patent, is:

1. In combination, tuned high frequency discriminating means for producing zero output voltage in response to zero input voltage and in response to an oscillation of relatively high frequency corresponding to the tuning thereof and for producing a unidirectional output voltage in response to oscillations of other high frequencies, the polarity of said unidirectional output voltage depending upon whether the frequency of said high frequency oscillations is greater or less than the value corresponding to the tuning of the frequency discriminating means, and means for utilizing an oscillation of relatively low frequency to apply to said discriminating means a first high frequency oscillation during predetermined time intervals of said low frequency oscillation and a second high frequency oscillation during other predetermined time intervals of said low frequency oscillation for producing zero oscillating output voltage from the discriminating means when the second high frequency oscillation corresponds to the first high frequency oscillation and for producing an oscillating output voltage at said low frequency from the discriminating means when the second high frequency oscillation differs from the first high frequency oscillation, the phase of said oscillating output voltage depending upon the polarity of the output voltage during said other predetermined time intervals.

2. In a control apparatus, the combination of, tunable means including means for generating an oscillation of relatively high frequency, tuned high frequency discriminating means responsive to said high frequency oscillation and means for modifying the amplitude of the high frequency oscillation before application thereof to said discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, and phase responsive control means controlled by said resulting oscillation.

3. In a control apparatus, the combination of, tunable means including means for generating an oscillation of relatively high frequency, tuned high frequency discriminating means responsive to said high frequency oscillation and means for modifying the amplitude of the high frequency oscillation before application thereof to said discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, phase responsive means controlled by said resulting oscillation, means for detuning said tunable means to cause operation of the phase responsive means, and means controlled by said phase responsive means to retune said tunable means to stop operation of the phase responsive means.

4. In a control apparatus, the combination of, tunable means including means for generating an oscillation of relatively high frequency, tuned high frequency discriminating means responsive to said high frequency oscillation and means for modifying the amplitude of the high frequency oscillation before application thereof to said discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, a two phase induction motor controlled by said resulting oscillation, means for detuning said tunable means to cause operation of the motor in one direction or the other depending upon the phase of the resulting oscillation, and means controlled by said motor to retune said tunable means to stop operation of the motor.

5. In a control apparatus, the combination of, tunable means including means for generating an oscillation of relatively high frequency variable over a predetermined frequency range in accordance with the adjustment of said tunable means, tuned high frequency discriminating means responsive to said high frequency oscillation, means for modifying before application to said discriminating means the amplitude of the high frequency oscillation applied to said discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, first tuning means for controlling the oscillation generating means and second tuning means for controlling the tuned high frequency discriminating means, phase responsive means controlled by the resulting oscillation, means for changing the tuning of one of said tuning means for detuning the tunable means to cause operation of the phase responsive means, and means for changing the tuning of one of said tuning means for retuning the tunable means to stop operation of said phase responsive means.

6. In a control apparatus, the combination of, tunable means including means for generating an oscillation of relatively high frequency, tuned high frequency discriminating means responsive to said high frequency oscillation and to which the high frequency oscillation alone is applied, means for modifying the amplitude of the high frequency oscillation before application to said discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, and tuning means for controlling the oscillation generating means, phase responsive means controlled by the resulting oscillation, means for changing the tuning of said tuning means for detuning the tunable means to cause operation of said phase responsive means, and means controlled by said phase responsive means for changing the tuning of said tuning means for retuning the tunable means to stop operation of said phase responsive means.

7. In a control apparatus, the combination of, tunable means including means for generating an oscillation of relatively high frequency, tuned high frequency discriminating means responsive to said high frequency oscillation and to which the high frequency oscillation alone is applied, means for modifying the amplitude of the high frequency oscillation before application to said discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, and tuning means for controlling the tuned high frequency discriminating means, phase responsive means controlled by the resulting oscillation, means for changing the tuning of said tuning means for detuning the tunable means to cause operation of the phase responsive means, and means controlled by the phase responsive means for changing the tuning of said tuning means for retuning the tunable means to stop operation of said phase responsive means.

8. In a control apparatus, the combination of, tunable means including means for generating an oscillation of relatively high frequency, tuned high frequency discriminating means responsive to said high frequency oscillation and to which the high frequency oscillation alone is applied, means for modifying the amplitude of the high frequency oscillation before application to said discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, first tuning means for controlling the oscillation generating means and second tuning means for controlling the tuned high frequency discriminating means, phase responsive means controlled by the resulting oscillation, means for changing the tuning of one of said tuning means for detuning the tunable means to cause operation of the phase responsive means, and means for changing the tuning of the other of said tuning means for retuning the tunable means to stop operation of said phase responsive means.

9. In combination, high frequency discriminating means operative to produce an output voltage of one polarity or of opposite polarity depending upon whether the frequency of a high frequency oscillation applied thereto is greater or less than a predetermined value, means for generating a first oscillation of relatively high frequency, means for generating a second oscillation of relatively high frequency, and means operating at a relatively low frequency for alternately applying the first and second high frequency oscillations to the high frequency discriminating means.

10. In a control apparatus, the combination of, tunable means including means for generating an oscillation of relatively high frequency variable over a predetermined frequency range in accordance with the adjustment of said tunable means, a source of oscillation of relatively low frequency and tunable discriminating means controlled by said high frequency oscillation, means for modifying the amplitude of the high frequency oscillation in accordance with the low frequency oscillation before application of the high frequency oscillation to said discriminating means for producing, upon detuning, a resulting oscillation at said low frequency of one phase or of opposite phase depending upon the frequency of the high frequency oscillation and the tuning of the tunable means, said tunable discriminating means being adjustably tunable to various conditions in each of which a given frequency of the high frequency oscillation causes the magnitude of said resulting oscillation to be zero, a two phase induction motor coupled to said tunable discriminating means for controlling the tuning thereof to reduce said resulting oscillation, said motor having a power winding and a control winding, means for coupling the power winding to the source of oscillation of relatively low frequency, and means for coupling the control winding to the discriminating means whereby the motor is operated in a direction corresponding to the phase of the resulting oscillation.

11. In a control apparatus, the combination of, tunable means including means for generating an oscillation of relatively high frequency, a source of oscillation of relatively low frequency and discriminating means controlled by said high frequency oscillation, means for modifying the amplitude of the high frequency oscillation in accordance with the low frequency oscillation before application of the high frequency oscillation to said discriminating means for producing, upon detuning, a resulting oscillation at said low frequency of one phase or of opposite phase depending upon the frequency of the high frequency oscillation and the tuning of the tunable means and having an amplitude depending upon the frequency of the high frequency oscillation and the tuning of the tunable means, electronic tube means associated with said discriminating means for limiting the amplitude of said resulting oscillation, a two phase motor having a power winding and a control winding, means for coupling the power winding to the source of oscillation of relatively low frequency, and means for coupling the control winding to the discriminating means whereby the motor is operated in a direction corresponding to the phase of the resulting oscillation, at maximum speed when the resulting oscillation is limited and at slower speeds corresponding to the unlimited resulting oscillation.

12. In a control apparatus, the combination of, tunable means including means for generating an oscillation of relatively high frequency, a source of oscillation of relatively low frequency and discriminating means controlled by said high frequency oscillation, means for modifying the amplitude of the high frequency oscillation in accordance with the low frequency oscillation before application of the high frequency oscillation to said discriminating means for producing, upon detuning, a resulting oscillation at said low frequency of one phase or of opposite phase depending upon the frequency of the high frequency oscillation and the tuning of the tunable means and having an amplitude depending upon the frequency of the high frequency oscillation and the tuning of the tunable means, electronic tube means associated with said discriminating means for limiting the amplitude of said resulting oscillation, a two phase motor having a power winding and a control winding, means for coupling the power winding to the source of oscillation of relatively low frequency, means for coupling the control winding to the discriminating means whereby the motor is operated in a direction corresponding to the phase of the resulting oscillation, at maximum speed when the resulting oscillation is limited and at slower speeds corresponding to the unlimited resulting oscillation, means for detuning said tunable means to cause operation of the motor, and means controlled by the motor for retuning said tunable means to stop operation of the motor.

13. In a control apparatus, the combination of, a rotary field motor comprising a rotor, a power winding and a control winding, means for passing a fluctuating current of predetermined relatively low frequency through the power winding, means for passing a fluctuating current of the same predetermined frequency through the control winding leading or lagging the current passing through the power winding to cause rotation of the rotor in one direction or the other and for passing a current having a fluctuating component of different frequency through the control winding to retard rotation of the rotor, said last mentioned means comprising tunable means including means for generating an oscillation of relatively high frequency, means responsive to the high frequency oscillation, and means for modifying the amplitude of the high frequency oscillation in accordance with an oscillation of said predetermined relatively low frequency before application of the high frequency oscillation to said responsive means for producing, upon detuning, said fluctuating current of predetermined frequency of one phase or of opposite phase depending upon the frequency of the high frequency oscillation and the tunable means and for producing, upon tuning, said current having a fluctuating component of different frequency.

14. In a control apparatus, the combination of, a rotary field motor comprising a rotor, a power winding and a control winding, means for passing a fluctuating current of predetermined relatively low frequency through the power winding, means for passing a fluctuating current of the same predetermined frequency through the control winding leading or lagging the current passing through the power winding to cause rotation of the rotor in one direction or the other and for passing a current having a fluctuating component of different frequency through the control winding to retard rotation of the rotor, said last mentioned means comprising tunable means including means for generating an oscillation of relatively high frequency, means responsive to the high frequency oscillation, and means for modifying the amplitude of the high frequency oscillation in accordance with an oscillation of said predetermined relatively low frequency before applicatiton of the high frequency oscillation to said responsive means for producing, upon detuning, said fluctuating current of predetermined frequency of one phase or of opposite phase depending upon the frequency of the high frequency oscillation and the tunable means and for producing, upon tuning, said current having a fluctuating component of different frequency, means for detuning the tunable means to cause rotation of the rotor in one direction or the other, and means controlled by the rotor for retuning said tunable means to retard and stop rotation of the rotor.

15. In a control apparatus, the combination of, a rotary field motor comprising a rotor, a power winding and a control winding, means for passing a fluctuating current of predetermined relatively low frequency through the power winding, means for passing a fluctuating current of the same predetermined frequency through the control winding leading or lagging the current passing through the power winding to cause rotation of the rotor in one direction or the other and for passing a relatively steady current through the control winding to retard rotation of the rotor, said last mentioned means comprising tunable means including means for generating an oscillation of relatively high frequency, means responsive to the high frequency oscillation, and means for modifying the amplitude of the high frequency oscillation in accordance with an oscillation of said predetermined relatively low frequency before application of the high frequency oscillation to said responsive means for producing, upon detuning, said fluctuating current of predetermined frequency of one phase or of opposite phase depending upon the frequency of the high frequency oscillation and the tunable means and for producing, upon tuning, said relatively steady current.

16. In a control apparatus, the combination of, a rotary field motor comprising a rotor, a power winding and a control winding, means for passing a fluctuating current of predetermined relatively low frequency through the power winding, means for passing a fluctuating current of the same predetermined frequency through the control winding leading or lagging the current passing through the power winding to cause rotation of the rotor in one direction or the other and for passing a relatively steady current through the control winding to retard rotation of the rotor, said last mentioned means comprising tunable means including means for generating an oscillation of relatively high frequency, means responsive to the high frequency oscillation, and means for modifying the amplitude of the high frequency oscillation in accordance with an oscillation of said predetermined relatively low frequency before application of the high frequency oscillation to said responsive means for producing, upon detuning, said fluctuating current of predetermined frequency of one phase or of opposite phase depending upon the frequency of the high frequency oscillation and the tunable means and for producing, upon tuning, said relatively steady current, means for detuning the tunable means to cause rotation of the rotor in one direction or the other, and means controlled by the rotor for retuning said tunable means to retard and stop rotation of the rotor.

17. In a condition measuring apparatus, the combination of means including first tunable means for generating an oscillation of relatively high frequency variable over a predetermined range of frequencies in accordance with the tuning of said first tunable means and second tunable means responsive to the high frequency oscillation, means for modifying the amplitude of the high frequency oscillation in accordance with a second oscillation of relatively low frequency before application of the high frequency oscillation to said responsive means for producing, upon detuning, a resulting oscillation of relatively low frequency and of one phase or of opposite phase depending upon the frequency of the high frequency oscillation and the tuning of the second tunable means, phase responsive means controlled by the resulting low frequency oscillation, means responsive to the condition being measured for detuning said first tunable means upon a change in said condition to cause operation of the phase responsive means, and means positioned by said phase responsive means to retune said second tunable responsive means to stop operation of the phase responsive means and to assume a position in accordance with the then existing value of the condition.

18. In a condition indicating apparatus, the combination of, means including first tunable means for generating an oscillation of relatively high frequency variable over a predetermined range of frequencies in accordance with the tuning of said first tunable means and second tunable means responsive to the high frequency oscillation, means for modifying the amplitude of the high frequency oscillation in accordance with a second oscillation of relatively low frequency before application of the high frequency oscillation to said responsive means for producing, upon detuning, a resulting oscillation of relatively low frequency and of one phase or of opposite phase depending upon the frequency of the high frequency oscillation and the tuning of the second tunable means, phase responsive means controlled by the resulting low frequency oscillation, means responsive to the condition being measured for detuning said first tunable means upon a change in said condition to cause operation of the phase responsive means, means controlled by said phase responsive means to retune said second tunable responsive means to stop operation of the phase responsive means, and indicating means controlled by said phase responsive means for indicating the then existing value of the condition.

19. In a condition control apparatus, the combination of, means including first tunable means for generating an oscillation of relatively high frequency variable over a predetermined range of frequencies in accordance with the tuning of said first tunable means and second tunable means responsive to the high frequency oscillation, means for modifying the amplitude of the high frequency oscillation in accordance with a second oscillation of relatively low frequency before application of the high frequency oscillation to said responsive means for producing, upon detuning, a resulting oscillation of relatively low frequency and of one phase or of opposite phase depending upon the frequency of the high frequency oscillation and the tuning of the second tunable means, phase responsive means controlled by the resulting low frequency oscillation, means responsive to the condition being measured for detuning said first tunable means upon a change in said condition to cause operation of the phase responsive means, means controlled by said phase responsive means to retune said second tunable responsive means to stop operation of the phase responsive means, and condition control means controlled by said phase responsive means for controlling the condition.

20. In a repeating or telemetering or torque amplifying apparatus, the combination of, means including first tunable means for generating an oscillation of relatively high frequency variable over a predetermined range of frequencies in accordance with the tuning of said first tunable means and second tunable means responsive to the high frequency oscillation, means for modifying the amplitude of the high frequency oscillation in accordance with a second oscillation of relatively low frequency before application of the high frequency oscillation to said responsive means for producing, upon detuning, a resulting oscillation of relatively low frequency and of one phase or of opposite phase depending upon the frequency of the high frequency oscillation and the tuning of the second tunable means, phase responsive means controlled by the resulting low frequency oscillation, a position controlling member, means operated by said position controlling member for detuning said first tunable means upon change in position of said member to cause operation of the phase responsive means, and means positioned by said phase responsive means to retune said second tunable responsive means to stop operation of the phase responsive means and to assume a position in accordance with the position of the position controlling member.

21. In a control apparatus, the combination of, means including first tunable means for generating an oscillation of relatively high frequency variable over a predetermined range of frequencies in accordance with the tuning of said first tunable means and second tunable means responsive to the high frequency oscillation, means for modifying the amplitude of the high frequency oscillation in accordance with a second oscillation of relatively low frequency before application of the high frequency oscillation to said responsive means for producing, upon detuning, a resulting oscillation of relatively low frequency and of one phase or of opposite phase depending upon the frequency of the high frequency oscillation and the tuning of the second tunable means, phase responsive control means controlled by the resulting low frequency oscillation, positionable means for detuning said first tunable means to cause operation of the phase responsive means, and means positioned by said phase responsive means to retune said second tunable responsive means to stop operation of the phase responsive means and to assume a position determined by the phase responsive means, said positionable detuning means and said positioned retuning means being so characterized with respect to each other as to cause the positioned retuning means to assume definite positions with respect to positions of the positionable detuning means.

22. In a flow meter, the combination of, tunable means including means for generating a variable frequency oscillation of relatively high frequency and means responsive to the high frequency oscillation, means for modifying the amplitude of the high frequency oscillation in accordance with a second oscillation of relatively low frequency before application of the high frequency oscillation to said responsive means for producing, upon detuning, a resulting oscillation of relatively low frequency and of one phase or of opposite phase depending upon the frequency of the high frequency oscillation and the tuning of the tunable means, phase responsive means controlled by the resulting low frequency oscillation, manometer actuated means positioned in accordance with the square of the rate of flow for detuning said tunable means to vary the frequency of said oscillation upon a change in the rate of flow to cause operation of the phase responsive means, and means positioned by the phase responsive means to retune said tunable means to stop operation of the phase responsive means, the relationship between the detuning means and the retuning means being the square power whereby the retuning means is positioned in linear accordance with the rate of flow.

23. In a control apparatus, the combination of tunable high frequency discriminating means responsive to oscillations of relatively high frequency applied thereto for producing an output voltage of one polarity or opposite polarity according to the frequency of said oscillations and the tuning of said discriminating means, means for modifying the amplitude of the high frequency oscillations before application thereof to said high frequency discriminating means in accordance with a second oscillation of relatively low frequency whereby the output voltage of said discriminating means undulates at said low frequency and is of one phase or of opposite phase depending upon the frequency of said high frequency oscillations and the tuning of said discriminating means, phase responsive means controlled by said output voltage, and means controlled by said phase responsive means to vary the tuning of said discriminating means to stop operation of said phase responsive means.

24. In a control apparatus, the combination of, tunable means including means for generating an oscillation of relatively high frequency variable over a predetermined frequency range in accordance with the tuning of said tunable means, tunable high frequency discriminating means responsive to the frequency of said high frequency oscillation, means for modifying the amplitude of the high frequency oscillation before application to said frequency discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, phase responsive means controlled by said resulting oscillation, means for detuning said tunable means to cause operation of the phase responsive means, and means controlled by said phase responsive means to vary the tuning of said tunable high frequency discriminating means to stop operation of the phase responsive means.

25. In a control apparatus, the combination of, tunable means including means for generating an oscillation of relatively high frequency variable over a predetermined frequency range in accordance with the tuning of said tunable means, tunable high frequency discriminating means responsive to the frequency of said high frequency oscillation and means for modifying the amplitude of the high frequency oscillation before application to said frequency discriminating means in accordance with a second oscillation of relatively low frequency for producing, upon detuning, a resulting oscillation at said relatively low frequency and of a phase depending upon the frequency of said high frequency oscillation with respect to the frequency tuning of said discriminating means, a two-phase induction motor controlled by said resulting oscillation, means for detuning said tunable means to cause operation of the motor in one direction or the other depending upon the phase of the resulting oscillation, and means controlled by said motor to vary the tuning of said tunable high frequency discriminating means to stop operation of said motor.

RUDOLF F. WILD.

REFERENCES CITED

The following references are of record in the file of this patent:

UNITED STATES PATENTS

| Number | Name | Date |
| --- | --- | --- |
| 2,041,855 | Ohl | May 26, 1936 |
| 2,103,741 | Bencowitz | Dec. 28, 1937 |

(Other references on following page)

UNITED STATES PATENTS

| Number | Name | Date |
|---|---|---|
| 2,126,910 | Moseley | Aug. 16, 1938 |
| 2,151,127 | Logan et al. | Mar. 21, 1939 |
| 2,251,064 | Martin, Jr., et al. | July 29, 1941 |
| 2,260,122 | Moore | Oct. 21, 1941 |
| 2,280,019 | Alexandersson et al. | Apr. 14, 1942 |
| 2,283,523 | White | May 19, 1942 |
| 2,284,266 | Bellescize | May 26, 1942 |
| 2,303,654 | Newton | Dec. 1, 1942 |
| 2,310,328 | Swift | Feb. 9, 1943 |
| 2,312,761 | Hershberger | Mar. 2, 1943 |
| 2,334,704 | Hilferty | Nov. 23, 1943 |
| 2,351,193 | Crosby | June 13, 1944 |
| 2,355,537 | Jones | Aug. 8, 1944 |
| 2,361,437 | Trevor | Oct. 31, 1944 |
| 2,364,483 | Side | Dec. 5, 1944 |
| 2,369,542 | Dietrich | Feb. 13, 1945 |
| 2,379,689 | Crosby | July 3, 1945 |
| 2,396,091 | DeBey | Mar. 5, 1946 |
| 2,442,286 | Dodds et al. | Feb. 25, 1948 |

FOREIGN PATENTS

| Number | Country | Date |
|---|---|---|
| 474,967 | Great Britain | Nov. 10, 1937 |